(12) United States Patent
Tang et al.

(10) Patent No.: US 11,663,805 B1
(45) Date of Patent: May 30, 2023

(54) UTILIZING SENSOR DATA FOR AUTOMATED USER IDENTIFICATION

(71) Applicant: Amazon Technologies, Inc., Seattle, WA (US)

(72) Inventors: Zheng Tang, Redmond, WA (US); Prithviraj Banerjee, Redmond, WA (US); Manoj Aggarwal, Seattle, WA (US); Gerard Guy Medioni, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 17/209,845

(22) Filed: Mar. 23, 2021

(51) Int. Cl.
  *G06K 9/62* (2022.01)
  *G06V 10/25* (2022.01)
  *G06V 40/12* (2022.01)

(52) U.S. Cl.
  CPC ........... *G06V 10/25* (2022.01); *G06K 9/6215* (2013.01); *G06K 9/6262* (2013.01); *G06V 40/1335* (2022.01); *G06V 40/1347* (2022.01); *G06V 40/1365* (2022.01)

(58) Field of Classification Search
  CPC .......................... G06V 40/12–40/1394; G06V 40/1347–40/1376
  See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 10,728,242 B2 * | 7/2020 | LeCun ................ | G06K 9/6271 |
| 2013/0284806 A1 | 10/2013 | Margalit | |

\* cited by examiner

*Primary Examiner* — Brian Werner
(74) *Attorney, Agent, or Firm* — Lee & Hayes, P.C.

(57) ABSTRACT

This disclosure describes a user-recognition system that may perform one or more verification methods upon identifying a previous image that matches a current image of a palm of a user. For instance, the user-recognition system may perform the verification method(s) as part of the recognition method (e.g., after recognizing a matching image), in response to an audit process, in response to a request to re-analyze the image data (e.g., because a user indicates that he or she was not associated with a particular purchase or shopping session), and/or the like.

18 Claims, 13 Drawing Sheets

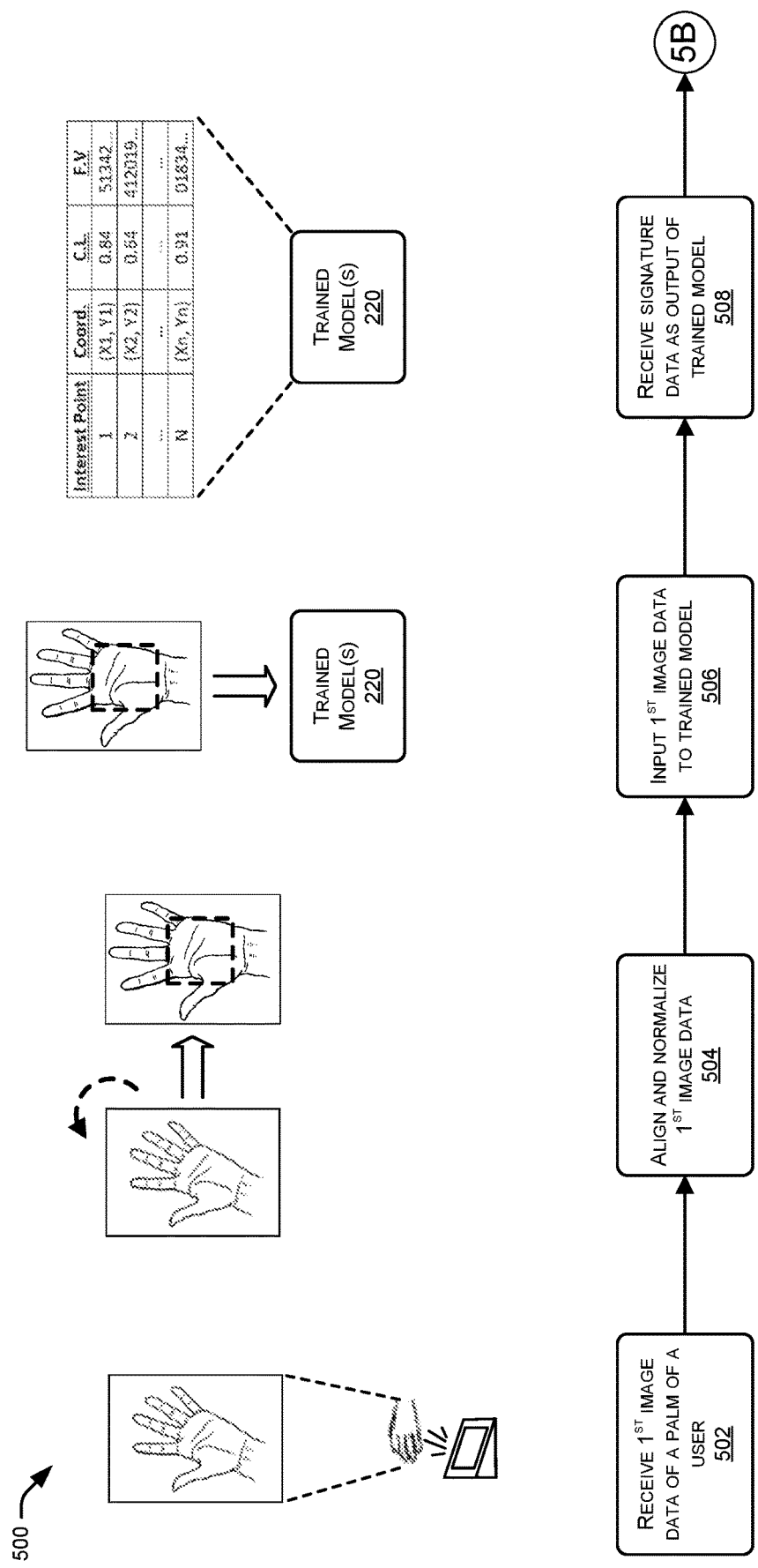

UTILIZING SENSOR DATA FOR AUTOMATED USER IDENTIFICATION

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize various types of sensors to allow users to acquire and pay for items without cashiers or dedicated self-checkout stands. In some examples, it may be desirable to identify customers using methods that do not require the use of physical objects and charge the appropriate customer accounts for items taken from the physical stores by the customers.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 5A-B collectively illustrate another sequence of operations for verifying that first image data of a portion (e.g., a palm) of a user corresponds to second image data.

DETAILED DESCRIPTION

Figure 1:
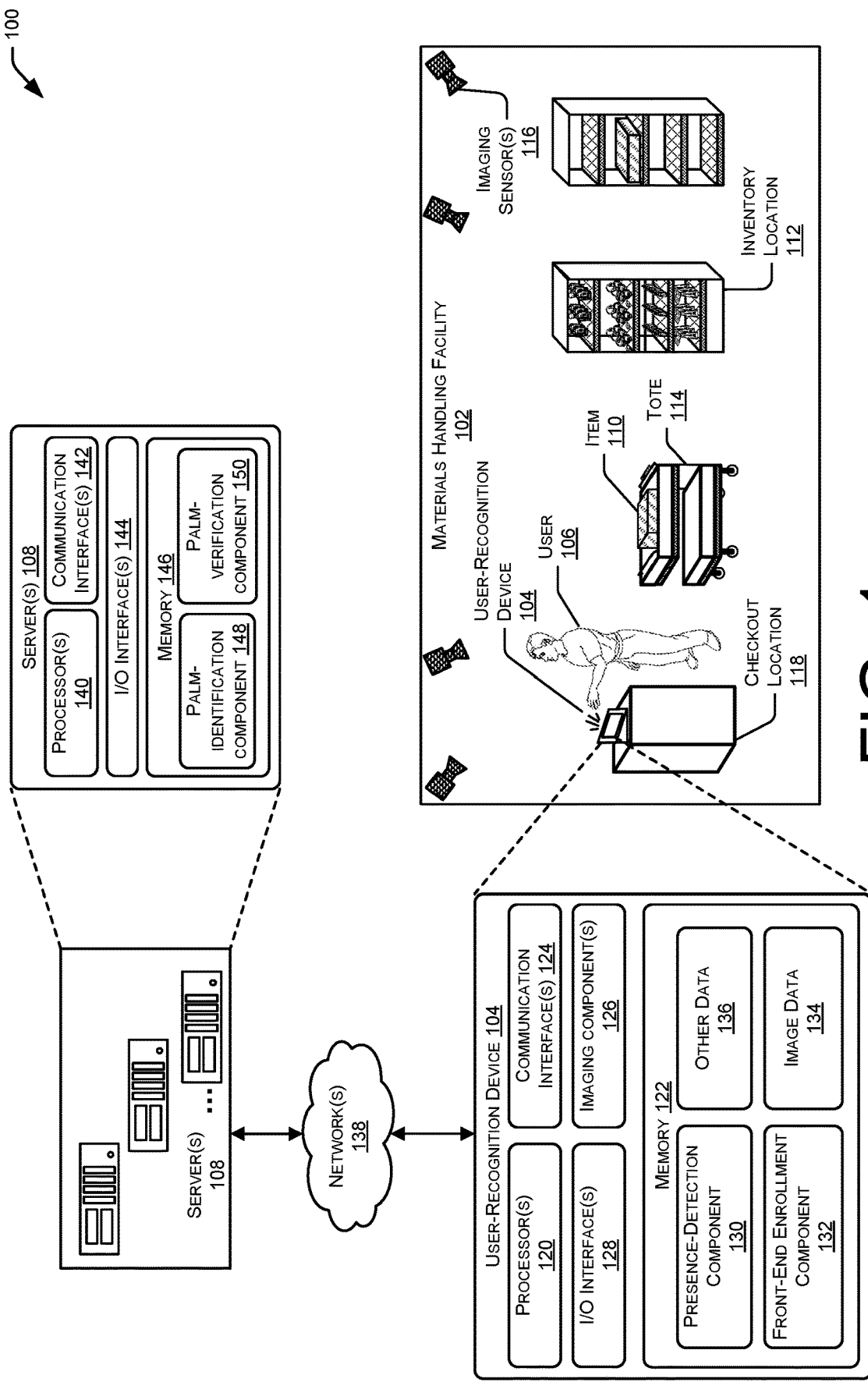
FIG. 1 illustrates an example environment that includes a user-recognition device configured to generate image data of a palm of a user for purposes of identifying the user. After generating the image data, the user-recognition device sends the image data to one or more servers, which include a palm-identification component to identify the user by matching the image data to previously captured image data of a palm of the user. In addition, the servers may include a palm-verification component to verify the match between the image data and the previously captured image data.

This disclosure describes systems and techniques for identifying users using biometric-recognition techniques. As described below, users may enroll with a user-recognition system that utilizes various biometric-based recognition techniques so users may be identified without having to carry or use traditional forms of identification, such as showing an ID card or accessing their personal phone. The user-recognition system may recognize, or identify, enrolled users for various purposes, such as for automating traditional checkout experiences in a materials handling facility (or "facility") by charging appropriate user accounts with purchases of items selected by enrolled users in the facility. The user-recognition system may also perform one or more verification methods for ensuring that a proper identification has been made.

In one illustrative example, the systems and techniques are used to recognize or identify users within a materials handling facility, which may include, or have access to, an inventory-management system. The inventory-management system may be configured to maintain information about items, users, condition of the facility, and so forth. For example, the inventory-management system may maintain data indicative of a result of different events that occur within the facility, such as what items a particular user picks or returns, a location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of the user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the user-recognition system and charging a user account for that user with the cost of the items included in their virtual shopping cart. According to the techniques described herein, a user enrolled with the user-recognition system may need only provide biometric information by, for example, scanning a palm of the user at an imaging device, scanning a fingerprint of the user, looking at a camera of a user-recognition device located in the facility, or the like in order to be identified by the user-recognition system.

To utilize the user-recognition system, a user may request to be enrolled by interacting with a user-recognition device positioned in a facility. For example, the user may select an enroll option on a display of the user-recognition device, issue a voice or GUI-based command requesting to be enrolled, insert a user ID card into the user-recognition device, and/or simply present their hand or palm before the user-recognition device to prompt the enrollment process.

Upon requesting to be enrolled in the user-recognition system, the user-recognition device may, with permission and/or upon explicit request by the user, begin collecting various types of biometric data, and/or other data, for the user. For example, the user-recognition device may include one or more imaging sensors (e.g., a camera) that begins capturing image data (e.g., an individual image, a sequence of images, a video, etc.) of at least a portion of the user, such as a palm of the user, a face of the user, or the like. In the example of the palm, the user-recognition device may request that the user move their hand to different angles and/or orientations as the device captures the image data and may also capture image data under different lighting conditions (e.g., no flash, flash, different light polarizations, etc.), to generate image data representing the palm of the user under different environmental conditions.

In some examples, the user may already have an account registered with the inventory-management system to pay for items selected during a shopping session. In such examples, the user-recognition device may determine a user account with which the user is registered in various ways, such as by requesting that the user insert a personal ID card (e.g., driver's license), scan a barcode that may be presented on a display of a phone of the user, login with his or her login credentials, and so forth.

Once the user-recognition device has obtained the image data representing the palm or other potion of the user, the user-recognition device may utilize this data to enroll the user with the user-recognition system. In some examples, the user-recognition system may be implemented entirely on the user-recognition device, which may include the software, firmware, and/or hardware components to implement the techniques described herein. However, in some examples, the user-recognition system may be implemented according to a split architecture where the user-recognition device performs client-side enrollment and identification techniques, and more intensive and/or advanced processing may be performed using a backend, server-based implementation. For example, the user-recognition system may include one or more network-based computing devices positioned at a separate location in the facility, and/or at a remote, cloud-based location. The network-based devices may include various components for implementing the user-recognition system.

In such examples, the user-recognition device may send the image data, and/or feature data generated by the user recognition device using the image data, to the network-based devices to enroll the user for the user-recognition system. The network-based devices of the user-recognition system may perform various processing techniques on the image data and/or feature data such that the user-recognition system is able to identify the user from subsequently received image data and/or feature data.

The user-recognition system may analyze the image data to determine various features of the user. For example, the user-recognition system may extract and/or generate, based on the image data, palm-feature data representing the palm of the user. This palm-feature data may represent information that is potentially unique to the palm of the user, such as the pattern of creases in the user's palm, the pattern of veins of the user's palm, the geometry of one or more portions of the user's hand (e.g., finger sizes/shape, palm size/shape, etc.), and/or the like. The user-recognition system may utilize any type of processing techniques to generate the palm-feature data and may represent the palm of the user depicted in the image data using various types of data structures, such as feature vectors. In some examples, the user-recognition system may include one or more trained models (e.g., machine-learning models) that have been trained to receive image data of a user as input, and output feature vectors representing a palm of the user. Generally, the trained model(s) may comprise any type of models, such as machine-learning models (e.g., artificial neural networks, convolution neural networks (CNNs), classifiers, random-forest models, etc.) that may be trained to identify a palm of a user and/or one or more other portions of the user (e.g., face, etc.).

In some instances, the models described herein may be trained to identify visually discriminative points of user palms or other portions of a user. For instance, the trained model(s) utilized by the palm-determination and/or palm-verification components described below may be trained to identify visually salient and discriminative points of a palm of a user as represented in image data. These points in first image data of a palm may be visually salient and discriminative such that they may be both matched to corresponding points in second image data of the same palm using computer-vision techniques, as well as by a human user analyzing these points. That is, the models described herein may be configured to identify interest points that are both used for matching between two or more different images, but also visually distinct enough such that they may be identified by human users within two different images for helping in determining, by the human users, whether the images represent the same palm.

Upon obtaining the feature data that represents the palm of the user, the user-recognition system may store the feature data in an enrollment database and associate the feature data with a user profile for that specific user. In this way, when subsequent image data is received for a user at a user-recognition device, the feature data stored in the enrollment database may be compared with the feature data generated from the subsequent image data to identify a user profile for the user represented in the subsequent image data and audio data.

In this way, the user may be enrolled for use of the user-recognition system such that, after completing subsequent shopping sessions, the user may checkout by placing his or her palm over an imaging component of a user-recognition device to allow the user-recognition system to automatically recognize the user. The user-recognition device may detect the presence of the user (e.g., detect the palm, detect a face, detect the speech utterance, detect a touch input via a touch display, etc.), and begin streaming image data and audio data to the backend devices of the user-recognition system. The backend devices of the user-recognition system may then utilize the trained model(s) to extract feature data and compare that feature data to stored feature data for user profiles of enrolled users. In addition, or in the alternative, the user may scan his or her palm for recognition upon entering the facility and, in some instances, may simply exit the facility with his or her picked items and without again scanning his or her palm. In these instances, the user may be identified upon entry and located by the system as the user moves about the facility, such that the user may "just walk out" without further interaction with associates or devices at the facility.

In some instances, the user-recognition system may perform one or more verification methods upon identifying a previous image that matches a current image of a palm of a user. For instance, the user-recognition system may perform the verification method(s) as part of the recognition method (e.g., after recognizing a matching image), in response to an audit process, in response to a request to re-analyze the image data (e.g., because a user indicates that he or she was not associated with a particular purchase or shopping session), and/or the like.

In some instances, a palm-verification component may perform the example verification methods described herein. As described in detail below, the palm-recognition component may first receive the current image data of a portion of a user, such as the image data of a palm of the user upon the user entering or exiting the environment. The palm-verification component, or another component, may then align the current image data to a predefined alignment, such that the component will be comparing the current image data to the previous (and matched) image data in a common orientation. In addition, the palm-verification component, or another component, may normalize the pixel values of the current image data. For instance, the palm-verification component may normalize each pixel value between zero (0) and two-hundred-fifty-five (255) based on a darkest pixel being normalized to zero and a lightest pixel being normalized to two-hundred-fifty-five. Further, the portion of the image data corresponding to the palm may be extracted from the image data during this alignment and normalization process. It is to be appreciated, meanwhile, that the current image data may have previously been aligned and/or normalized as part of the recognition process and prior to the verification process.

After aligning and normalizing the current image data of the palm of the user to generate processed image data, the palm-verification component may input the processed image data to a trained model (e.g., one of the models described above or below) that is configured to output signature data that represents the processed image data. For example, the trained model may be configured to identify portions of interest of the image data, such as points of interest that may uniquely represent the processed image data. For instance, the trained model may be trained and configured to identify points or regions of the processed image data having pixel values that differ significantly from neighboring points or regions. Thus, the model may be configured to identify points corresponding to creases or other noticeable and recognizable points of the image data of the palm of the user. Thus, the trained model may output signature data that corresponds to salient and discriminative interest points that a human user can also visually recognize, which may be useful in the human user making a manual determination of whether the current image data matches the previous image data determined to correspond a common palm. That is, while previous biometric-comparison models may identify points that are discriminative but not discernable to the human eye, the trained model(s) described herein may identify discriminative and salient points of user palms that are discernable by the human eye. Identifying these points may enable both automated comparison of the points, as well as visual comparison and verification by human users. Enabling human users to verify (or indicate that two palms or interest points identified therein do not match) may enable further training and/or debugging of the model and/or the identification/verification processes described herein.

In some instances, the signature data may comprise data that includes, for each of multiple interest points, respective coordinates in the processed image data of the respective interest point (e.g., respective (X, Y) coordinates), respective feature vectors calculated for the respective feature point and indicating pixel values associated with the respective interest point, and confidence values associated with the respective interest points, with the confidence levels indicating a confidence regarding the corresponding feature vector. In some instances, each interest point and its corresponding data output by the trained model may correspond to a first pixel and one or more neighboring or adjacent pixels. For instance, an interest point may correspond to a first pixel (at the identified (X, Y) coordinates) and its eight immediate neighbors. In these examples, each feature vector may be indicative of (normalized) pixel values of these nine pixels. Of course, while the interest point (or region of interest) may correspond to a 3×3 pixel region in some instances, in other instances it may correspond to a 7×7 pixel region, a 9×9 pixel region, or the like. Further, in some instances the number of pixels in these regions may change based on the resolution of the image data being analyzed. For instance, image data of a palm of a user may be captured or otherwise generated into first image data at a first resolution and second image data at a second, lower resolution. In this example, the interest point may correspond to a 9×9 pixel region in the first image data, while only a 3×3 pixel region in the second image data, even though these pixel regions are the same physical size given that each pixel is larger in the second image data. In some instances, certain portions of a palm of a user may be more salient in the first, higher resolution image data, while other portions of the palm may be more salient in the second, lower resolution image data. Thus, the interest points for a particular image of a palm of a user may be selected from image data of the same palm but associated with different resolutions.

After receiving this signature data as output of the trained model, the palm-verification component may filter (e.g., remove) one or more interest points associated with respective confidence levels that are less than a threshold confidence level. For instance, the palm-verification component may remove, or refrain from using in subsequent operations, each interest point that is associated with a confidence level that is less than 0.9, 0.7, or the like. In addition, or in the alternative, the palm-verification component may filter out interest points based on other criteria. For instance, the palm-verification component may utilize a boundary filter that filters out interest points on or near a boundary of the extracted portions of the user palms.

After filtering out one or more interest points, the palm-verification component may then compare the remaining interest points of the current, processed image data to interest points associated with the previous, matching image data. That is, the palm-verification component may attempt to determine whether any of the interest points of the current image data match (e.g., closely correspond to) interest points in the image data that the current image data has been determined to match. In some instances, the previous image data has already been analyzed and, thus, the palm-verification component simply receives the signature data (e.g., interest-point coordinates, feature vectors, and confidence levels) associated with the previous image data, while in other instances the palm-verification component may determine this signature data. For instance, the palm-verification component may receive the previous image data, input this data into the trained model, and receive, as output of the trained model, this signature data associated with the previous image data.

In either instance, the palm-verification component may analyze characteristics of the interest point(s) of the current image data with interest point(s) of the previous image data to determine whether (e.g., verify that) the current image data corresponds to the previous image data. For instance, the palm-verification component may begin with a first interest point of the current image data by determining whether the signature data of the previous image data includes one or more interest points associated with respective coordinates that are within a threshold spatial distance of coordinates of the first interest point. If so, the palm-verification component may compare the feature vector of the first interest point to the respective feature vector of each interest point of the previous image data that is within the threshold spatial distance to determine a similarity score. For instance, the palm-verification component may determine an Euclidian distance between the first interest point and each interest point of the previous image data within the threshold spatial distance. In some instances, this similarity score may be determined a match if the similarity score satisfies one or more threshold criteria, such as whether the Euclidian distance is less than a threshold. In addition, or in the alternative, the palm-verification component may determine that these points are a match if the identified interest point in the previous image data is within a top-N list of matching points for the first interest point of the current image data, as well as if the first interest point of the current image data is within a top-N list of matching points for the identified interest point of the previous image data. In other words, the points may be deemed a match to one another if each agrees that the other is a close match relative to other, spatially-close interest points. Of course, while one example is described here, in other instances the techniques may utilize one-way matching (e.g., rather than the described two-way matching), the Hungarian method, and/or other algorithms for maximum bipartite matching.

While the above example describes identifying a first interest point in the first image data having coordinates that are within a threshold spatial distance of coordinates of a second interest point in the second image data and then computing a Euclidian distance between these points, in some instances the spatial distance may be taken into account after the calculating of Euclidian distance between points and/or along with the Euclidian distance. For instance, information regarding the spatial distance and the Euclidian distance between two points may be input to a component that calculates a similarity score based on both of these distances in some examples.

After identifying one or more matching interest points, the palm-verification component may determine calculate a similarity score between the current image data and the previous image data based on the similarity scores associated with the matching points. For instance, the palm-verification component may compute a sum of a logarithm of an inverse of each feature-vector distance. This sum may then be compared to a threshold and, if the sum is greater (or less than) the threshold the current image data may verified as corresponding to the previous image data. In some instances, the similarity scores may be combined with (or further based on) one or more other processes or modalities for performing user-palm comparison. For instance, after determining the feature-vector distance as described above, the techniques may multiply this distance with the Euclidean distance between the embedded feature vectors of the entire palms as a final distance score, which may be more discriminative than an independent distance score. Of course, while one example is described, it is to be appreciated that other techniques may be used for determining the similarity between user palms.

In addition to outputting an indication of whether the first image data matches the second image data (and thus whether these image data represent the same palm), the components of the systems described herein may also output indications of the identified interest points in the first and second (and potentially additional) image data. For instance, the system may output an indication of a first interest point in the first image data that was determined to match to a second interest point in the second image, an indication of a third interest point in the first image data that was determined to match to a fourth interest point in the second image data, and so forth. For example, the system may output an indication of these respective indications atop the respective image data, potentially with some sort of indication of which point(s) in the first image data were determined to match which point(s) in the second image data, such as via a line that connects each set of two points across the first and second image data, a label that identifies each set of two points, visual indicia that identifies each set of two points, and so forth. Using these indications, and given that the interest points have been identified using the trained model(s) described above, the human user may analyze these visually salient and discriminative interest points to make an additional determination of whether the sets of interest points match each and/or whether the first and second image data represent the same palm. That is, given the output of these salient and discriminative interest points, the human user(s) may make an independent determination/verification regarding whether the first and second image data match one another.

Further, while the above example describes verifying whether first image data of a palm matches second image data of a palm, in other instances these techniques may be used for comparing the first image data to multiple different image data associated with different palms. For instance, the comparison described above may occur between signature data associated with the first image data and respective signature data associated with other respective image data (e.g., second, third, fourth, etc.). In some instances, for example, the techniques described herein may be used to compare the first image data to the "top N" number of candidate image data that may correspond to the palm represented in the first image data (e.g., the five most closely matched image data, etc.). For instance, the techniques may generate signature data of each user palm of enrolled users to form, offline, an enrollment pool. Thereafter, during an online process the techniques may apply the matching techniques described above to associate each recognition attempt with the enrolled identities.

In addition, in some instances, the look and/or makeup of user palms may change over time (e.g., due to callouses, scars, etc.) and, thus, the palm-feature data associated with respective user profiles may need to be updated over time to allow for accurate identification. Further, in some instances the palm-feature data or other biometric-based data stored by the user-recognition system may need to be removed from the system after a threshold amount of time after generating or receiving the data to comply with regulatory requirements. Thus, the user-recognition system may again update the palm-feature data over time to allow older data to be removed while still enabling the system to identify the respective users.

To maintain an accurate and/or current representation of the palm of the user, the user-recognition system may update the palm-feature data using image data, such as recently obtained image data, of the user. In some instances, the user-recognition system may collect and store image data for each occurrence of the user utilizing the user-recognition system, and periodically (e.g., every three months, every six months, etc.) utilize at least a portion of those images to update the palm-feature data stored in the enrollment database for the user. In some examples, the user-recognition system may update the palm-feature data upon detecting a significant change in the features of the palm of the user. By updating the palm-feature data using image data that is more recently obtained, the user-recognition system may maintain a more accurate representation of the enrolled users in order to more accurately identify enrolled users over time.

In some instances, the user-recognition system may store, for an individual user, multiple pieces of image data or palm-feature data corresponding to image data captured at different points in time. For instance, when a specific user first enrolls with the user-recognition system, the system may store, in association with a profile of the user, at least one of the image data of the user's palm and/or palm-feature data generated based on the image data. Therefore, when the user returns to a facility that utilizes the user-recognition system for identification and provides image data of the palm of the user, the palm-feature data generated using this new image data may be compared to the stored palm-feature data to determine when the user at the facility corresponds to the user associated with the profile. It is to be appreciated that this new palm-feature data may be compared to palm-feature data associated with multiple different user profiles for identifying the user.

Upon identifying the user by determining that the new palm-feature data corresponds to stored palm-feature data associated with a particular user profile, the user-recognition service may determine that the user at the facility corresponds to the user associated with the particular user profile. In addition to making this identification, however, the user-recognition may also store this new image data and/or the palm-feature data generated from this new image data in association with the user profile for later use in again identifying the user.

Therefore, envision that the same user again visits this facility or a different facility at still a later date. Upon the user scanning his or her palm using the user-recognition device at the facility, the user-recognition system may attempt to identify the user with reference to both the initial palm-feature data and the more-recent palm-feature data generated from the image data taken at the user's last visit to the (same or different) facility. Therefore, the user-recognition system may compare the newest palm-feature data to richer feature data, thus increasing the accuracy of the resulting recognition. Again, it is to be appreciated that the user-recognition may continue to update the enrollment data (e.g., palm-feature data) for each of multiple user profiles, such that the most-recently generated palm-feature data is compared to rich data across multiple different profiles.

In addition, the user-recognition system may remove older palm-feature data as the system continues to add most-recent feature data as enrollment data associated with a user profile. Continuing the example from above where the user initially enrolled with the system at a first time and thereafter visited the same or a different facility associated with the user-recognition system two times, the initial palm-feature data may be removed from the enrollment data associated with the corresponding user profile. Instead, the palm-feature data associated with the most recent two visits to the facilitie(s) may now be stored as the enrollment data for the user. Of course, while the above example describes removing the initially provided palm-feature data, in some instances the user-recognition system may employ weighting techniques with a sliding window to lessen the affect that older feature data has relative to newer feature data in terms of identifying users. Stated otherwise, the user-recognition may employ decay functions that cause the impact of older feature data on user recognition to decay over time.

In addition to updating the feature data associated with user profiles over time, in some instances the user-recognition system may perform periodic or continuous audits of the system to identify potential matching errors, to correct the errors, and to retrain the system for increased future accuracy. For example, in some instances the user-recognition system may employ a first level of matching in order to identify a user upon a user entering a facility and scanning his or her palm. This first level of matching may be performed locally at the user-recognition device or at one or more network-based devices associated with the user-recognition system. Regardless, after making an initial determination of the user based on the first level of matching, the user-recognition system may employ a second, more advanced level of matching at a later time. That is, the system may use additional computing resources to cross-match the newly generated palm-feature data against even more stored palm-feature data. If the system identifies an error, the system may correct the error and use information regarding the error and the correct match to retrain one or more trained models used by the system.

To provide an example, envision that a user enters a facility and scans his or her palm. Upon generating palm-feature data associated with image data of the palm, the user-recognition system may compare this feature data to, for example, a single piece of palm-feature data associated with a first user profile, a single piece of palm-feature data associated with a second user profile, and so forth. Envision that, based on this analysis, the user-recognition determines that the user corresponds to the first user profile. Thus, the system may store an indication that any transaction that occurs within the facility by the user is to be associated with the first user profile.

At a later time, however, the system may perform a deeper analysis. For example, the user-recognition system may compare the palm-feature data of the user with multiple pieces of palm-feature data associated with the first user profile, multiple pieces of palm-feature data associated with the second user profile, and so forth. Thereafter, the user-recognition system may determine that the palm-feature data actually corresponds to the second user profile rather than the first user profile. As such, the user-recognition system may store an association between the palm feature data and the second user profile and may remove the association between the palm feature data and the first user profile. The user-recognition system may also use the information associated with the initial error and the information associated with the new match to retrain one or more trained models employed for user identification.

In some instances, the user-recognition system may utilize different types of biometric and/or other types of information for identifying users. For example, a user may provide palm data, facial-recognition data, voice data, user ID/password data, and/or any other type of information that may be used to identify the user. To provide an example, a user may initially enroll with the user-recognition system may, for example, provide an image of a palm of the user. The system may associate the resulting feature data with an account of the user. In addition, the user may later provide additional information, such as facial-recognition data, which may also be associated with the user account. Therefore, when the user later requests that the user-recognition system identify the user, the user may scan his or her palm, provide an image of his or her face, and/or the like. The user-recognition system may then use whichever type or types of information that is provided to identify the user. Furthermore, as the user continues to engage with the user-recognition system over time, the user-recognition may continue to update enrollment data associated with the user as described below, potentially to include additional types of biometric data provided by the user over time.

In some instances, the user-recognition system may perform auditing processes on a periodic basis, such as nightly, weekly, or the like. In addition, or in the alternative, the user-recognition system may perform auditing processes in response to receiving user feedback, such as in response to a user indicating that he or she objects to a transaction or a match determined by the system. In still other instances, the system may perform auditing processes in response to a user being identified more or less than a threshold number of times within a certain amount of time, in response to a large transaction, in response to a transaction associated with a large number of items, in response to learning additional information regarding a user (e.g., that a user was not located at a city or state associated with a facility at which he or she was allegedly identified), or in response to occurrence of any other predefined event. In some instances, after receiving user feedback (e.g., in the form of a user indicating that he or she objects to a transaction or a match determined by the system), the user-recognition system may perform a higher level of analysis to determine whether image data associated with the transaction was misidentified. In some instances, if the system is unable to confirm with a threshold level of confidence whether it was or was not misidentified, then the user-recognition system may send the image data (potentially along with other relevant data) to a computing device associated with a human associate for analysis by the human associate. The human associate may visually compare the image data to image data associated with the user in question and, potentially other users, to determine whether the image data was misidentified.

Further, while the above example describes an example where the user-recognition system corrects an error, potentially in response to user feedback, in other instances the user-recognition system may confirm its original conclusion. For example, envision that a user states that he or she was charged for a transaction that he or she did not participate in. In response, the user-recognition system may perform a rich auditing process by comparing the palm-feature data associated with the visit in question to a large amount of palm-feature data associated with a user profile of that user and with other user profiles. Rather than identify an error, in some instances the user-recognition system may confirm the initial identification and, thus, the feedback from the user indicating he or she did not participate in the transaction may be deemed fraudulent.

Although the techniques described herein are primarily with reference to identifying users for the purpose of identifying a user account to charge for items selected from a materials handling facility, the techniques are equally applicable to any industry in which user recognition may be helpful. For instance, the user-recognition system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 that includes a materials handling facility 102 that includes a user-recognition device 104 configured to generate image data of a palm of a user for purposes of identifying the user. After generating the image data, the user-recognition device sends the image data to one or more servers, which include a palm-identification component to identify the user by matching the image data to previously captured image data of a palm of the user. In addition, the servers may include a palm-verification component to verify the match between the image data and the previously captured image data.

In some instances, some or all of the user-recognition system resides remotely from the materials handling facility 102, while in other instances some or all of the user-recognition system resides within or proximate to the materials handling facility 102. As FIG. 1 depicts, the user 106 may have engaged in, or be about to engage in, a shopping session in the materials handling facility 102. For instance, the user 106 may have selected an item 110 from an inventory location 112 (e.g., shelf, aisle, etc.) and placed the item 110 in a tote 114 (e.g., shopping cart). The inventory location 112 may house one or more different types of items 110 and the user 106 may pick (i.e., take) one of these items 110.

As illustrated, the materials handling facility 102 (or "facility") may include one or more sensors, such as the illustrated imaging sensors 116, and/or an array of other sensors located on or near the inventory location(s) 112. In this example, the imaging sensor(s) 116 are configured to capture video data within the facility 102 for use in determining results associated with events, such as the picking of the item 110 by the user 106. While FIG. 1 illustrates various example sensors, the sensors in the facility 102 may comprise any other type of sensor, such as weight sensors (e.g., load cells), microphones, and/or the like, as described in detail below. In some instances, the facility 102 may be monitored and/or otherwise associated with an inventory-management system configured to determine events in the facility 102 associated with the user 106, such as taking items 110 that the user 106 would like to purchase. The inventory-management system may track the items 110 selected by the user 106 and maintain a virtual shopping cart which includes all of the items 110 taken by the user 106. Thus, when a user 106 would like to leave the facility 102 with the items 110 they have taken, the inventory-management system may charge a user account associated with the user 106 for the cost of the items 110 that were taken.

As shown in FIG. 1, the user 106 may approach a checkout location 118 associated with the user-recognition device 104. The user 106 may determine that they would like to enroll for use of a user-recognition system in order to checkout of the facility 102 and pay for their item(s) 110. Alternatively, or additionally, the user may interact with the user-recognition device 104 upon entering or exiting the facility 102. In either instance, the user 106 may determine that they would like the user-recognition system to securely generate data that is usable to identify the user 106. This data may be utilized by the user-recognition system such that, once enrolled, the user 106 need only scan his or her palm to be identified by the user-recognition system in order to charge their user account with the purchase of their item(s)

110 and/or to otherwise later recognize an account or identifier of the user 106 at the explicit request of the user 106.

As illustrated, the user-recognition device 104 may comprise one or more processors 120 configured to power components of the device 104 and may further include memory 122 which stores components that are at least partially executable by the processor(s) 120, as well as other data. For example, the memory 122 may include a presence-detection component 130 to detect the presence of a user 106 and a front-end enrollment component 132 configured to perform various operations for enrolling the user 106 for use of the user-recognition system.

In some instances, the front-end enrollment component 132 may receive a request to enroll the user 106 for use of the user-recognition system. The request may comprise various types of input, such as a selection made via an I/O interface 128 (e.g., touch screen, mouse, keyboard, etc.) of a user interface element presented on a display for starting an enrollment process. Additionally, the front-end enrollment component 132 may detect a speech utterance from the user 106 indicating a request to enroll (e.g., "please enroll me," "I would like to check out," etc.). Another request example may include the user 106 sliding a user ID card into an I/O interface 128, such as a credit card, driver's license, etc. However, any type of input may be detected as a request by the front-end enrollment component 132.

In some examples, the presence-detection component 130 may be executable by the processor(s) 120 to detect a trigger indicating presence of the user 106. The trigger detected by the presence-detection component 130 may comprise one or more types of input. For instance, the presence-detection component 130 may include logic to detect, using one or more imaging components 126, a palm of the user 106 over or proximate to the user-recognition device 104. Other examples of triggers detected by the presence-detection component 130 that may indicate the presence of the user 106 may include receiving touch input (or other input, such as a mouse click) via one or more I/O interfaces 128 of the user-recognition device 104. However, any type of input may be detected as a trigger by the presence-detection component 130. In some examples, the trigger detection may not be performed, or may be included in or the same as receiving the request to enroll.

After receiving the request to enroll from the user 106, the front-end enrollment component 132 may, begin generating image data 134 using one or more imaging component(s) 126 (e.g., cameras). For instance, the front-end enrollment component 132 may utilize the imaging component(s) 126 to obtain image data 134 such as an image or picture, a sequence of consecutive images, and/or video data. The image data 134 may represent the palm of the user 106 and may be used to identify creases in the palm, veins in the palm, geometric information regarding the palm and other parts of the hand or the user 106 and/or the like. Once the front-end enrollment component 132 has obtained the image data 134 representing the palm or other portion of the user 106, the user-recognition device 104 may send (e.g., upload, stream, etc.) the image data 134 to the servers 108 over one or more networks 138 using one or more communication interfaces 124.

The network(s) 138 may include private networks such as an institutional or personal intranet, public networks such as the Internet, or a combination thereof. The network(s) 138 may utilize wired technologies (e.g., wires, fiber optic cable, and so forth), wireless technologies (e.g., radio frequency, infrared, acoustic, optical, and so forth), or other connection technologies. The network(s) 138 is representative of any type of communication network, including one or more of data networks or voice networks. The network(s) 138 may be implemented using wired infrastructure (e.g., copper cable, fiber optic cable, and so forth), a wireless infrastructure (e.g., cellular, microwave, satellite, etc.), or other connection technologies.

The communication interface(s) 124 may include devices configured to couple to personal area networks (PANs), wired and wireless local area networks (LANs), wired and wireless wide area networks (WANs), and so forth. For example, the communication interfaces 124 may include devices compatible with Ethernet, Wi-Fi™, and so forth. In some examples, the communication interface(s) 124 may encode the image data 134 and/or other data 136 generated by the user-recognition device 104 prior to sending over the network(s) 138 according to the type of protocol or standard being used.

Upon receiving the image data, one or more components of the back-end servers 108 may generate feature data using the image data. This feature data may be in a vector form and may represent characteristics about the user's palm that may be used to differentiate the palm from other user palms. It is to be appreciated that while this process describes the servers 108 generating the feature data, in other instances the user-recognition device 104 may be configured to generate the feature data and may send the feature data, in addition to or rather than the image data 134, to the servers.

After generating or receiving the feature data, one or more components of the servers 108 store the feature data in an enrollment database in association with a user profile of the user 106. That is, this palm-feature data is stored such that it may be compared to feature data generate from subsequent image data for later identification of the user 106 at the facility 102 or other facilities that are associated with the user-recognition system. In some instances, this feature data, or signature data, is associated with visually salient and discriminative interest points of the palm of the user 106, as described in detail below.

As illustrated, the server 108 may comprise one or more processors 140, one or more communication interfaces 142, one or more input/output interfaces 144, and memory 146, which may store a palm-identification component 148 and a palm-verification component 150. It is to be appreciated that the components 148 and 150 are described separately in some examples herein, in some instances the functionality of each component may be integrated, such as in examples where the functionality of the palm-verification component 150 is used in an identification process along with some or all of the techniques of the palm-identification component 148.

Sometime after the user has enrolled with the user-recognition system, the imaging components 126 may receive additional image data of the palm of the user 106, such as at a time when the user 106 has returned to the facility 102 at a later date. After the servers 108 receive the additional image data from the user-recognition device 104, the servers may generate additional feature data based on the additional image data. At this point, one or more components of the servers 108 may compare the additional feature data to feature data stored in respective user profiles for the purpose of identifying the user associated with the additional image data.

For example, the palm-identification component 148 of the user-recognition system may compare the additional feature data generated from the new image data with the feature data generated and stored in association with the user profile of the user 106 and, thus, determines that the additional image data corresponds to the user 106. To do so, the palm-identification component may compare the new feature data to feature data associated with each of multiple image data associated with respective user accounts, including the account of the user 106. In addition, the palm-verification component 150 may perform one or more of the verification processes between the newly generated image data and the image data previously stored in association with the account of the user 106 to verify that these two images do indeed match. Further, the palm-verification component 150 may output data (e.g., a graphical user interface (GUI)) identifying interest points in the new image data that this component has determined to match to interest points in the previously stored image data. For instance, the palm-verification component 150 may output a GUI that includes both of these image data and an indication of which points match between these respective image data. This information may be visually analyzed by a human user to provide an independent confirmation that the image data do in fact match, such as part of an audit process, in response to a user request to manually verify the match, and/or the like.

In some instances, in addition to identifying the user 106, the user-recognition system may then store the additional feature data in the enrollment database in association with the user profile of the user 106, as illustrated at 156. Therefore, this additional feature data, potentially along with the initial feature data, may be used for later identification of the user 106. Furthermore, as introduced above and discussed in further detail below, in some instances the user-recognition may remove or otherwise lessen the impact of older feature data over time such that more recent feature data associated with the user 106 is used more heavily (or exclusively) to identify the user 106.

Figure 2:
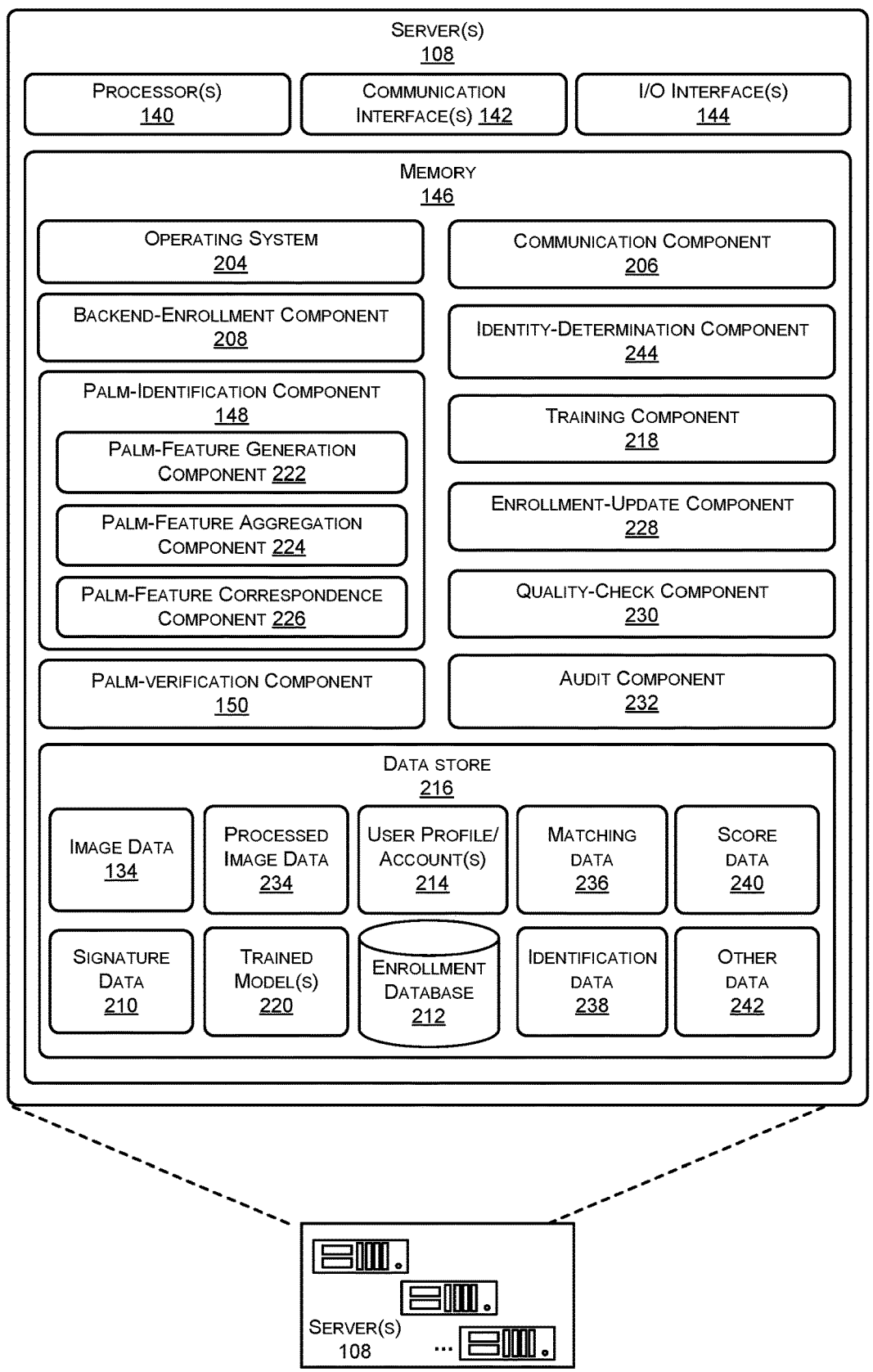
FIG. 2 illustrates example components of one or more servers configured to support at least a portion of the functionality of a user-recognition system, including the palm-identification component and the palm-verification component.

FIG. 2 illustrates example components of one or more servers 108 configured to support at least a portion of the functionality of a user-recognition system. In some examples, the user-recognition system described herein may be supported entirely, or at least partially, by the user-recognition device 104 in conjunction with the servers 108. The server(s) 108 may be physically present at the facility 102, may be at a remote location accessible by the network 138, or a combination of both. The server(s) 108 do not require end-user knowledge of the physical location and configuration of the system that delivers the services. Common expressions associated with the server(s) 108 may include "on-demand computing," "software as a service (SaaS)," "cloud services," "data centers," and so forth. Services provided by the server(s) 108 may be distributed across one or more physical or virtual devices.

The server(s) 108 may include the one or more hardware processors 140 (processors) configured to execute one or more stored instructions. The processors 140 may comprise one or more cores. The server(s) 108 may also the include one or more input/output (I/O) interface(s) 144 to allow the processors 140 or other portions of the server(s) 108 to communicate with other devices. The I/O interfaces 144 may comprise Inter-Integrated Circuit (I2C), Serial Peripheral Interface bus (SPI), Universal Serial Bus (USB) as promulgated by the USB Implementers Forum, RS-232, and so forth.

The server(s) 108 may also include the one or more communication interfaces 142. The communication interfaces 142 are configured to provide communications between the server(s) 108 and other devices, such as the user-recognition device 104, the interface devices, routers, and so forth. The communication interfaces 142 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi™, and so forth.

The server(s) 108 may also include one or more busses or other internal communications hardware or software that allow for the transfer of data between the various modules and components of the server(s) 108.

As shown in FIG. 2, the server(s) 108 includes one or more memories 146. The memory 146 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 146 provides storage of computer-readable instructions, data structures, program modules, and other data for the operation of the server(s) 108. A few example functional modules are shown stored in the memory 146, although the same functionality may alternatively be implemented in hardware, firmware, or as a system on a chip (SOC).

The memory 146 may include at least one operating system (OS) 204. The OS 204 is configured to manage hardware resource devices such as the I/O interfaces 144, I/O devices, the communication interfaces 142, and provide various services to applications or modules executing on the processors 140. The OS 204 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 146. These modules may be executed as foreground applications, background tasks, daemons, and so forth.

A communication component 212 may be configured to establish communications with one or more of the imaging sensors 116, the user-recognition devices 104, other server(s) 108, or other devices. The communications may be authenticated, encrypted, and so forth.

A backend-enrollment component 206 may be configured to perform various operations for enrolling a user 106 for use of the user-recognition system. For instance, the backend-enrollment component 208 may perform various operations, and/or cause other components to perform various operations, to enroll users 106 in the user-recognition system. In some instance, the backend-enrollment component 208 may at least partly control a palm-identification component 148 that performs operations for analyzing image data 134 depicting a palm or other portion of the user 106. In some examples, the backend-enrollment component 208 may cause the palm-identification component 148 to analyze the image data 134 and extract features which represent a palm of the user 106, which may be stored as signature data 210. The illustrated signature data 210 may comprise palm-feature data (e.g., salient and discriminative palm features and/or visually-imperceptible palm features), a confidence level associated with the respective feature data, coordinates of the each respective feature in the respective image data, and/or the like. As described herein, the signature data 210 may include palm-feature data and/or additional data.

After obtaining, determining, and/or generating the signature data 210, the backend-enrollment component 208 may enroll the user 106 in an enrollment database 212 which indicates that the user 106 is enrolled for use of the user-recognition system. In some examples, the backend-enrollment component 208 may associate, or map, the various data to a user profile/account 214 that is associated with the user 106. For example, the backend-enrollment component 208 may map, for each enrolled user 106, respective signature data 210 to corresponding user profiles 214 in the enrollment database 12. Thus, the enrollment database 212 may store indications of user profiles 214, as well as the data for users 106 associated with each of the user profiles 214. When a user 106 is enrolled for use of the user-recognition system, the backend-enrollment component 208 may map, or store an association, between the user's 106 signature data 210 with the user profile 214 for that user 106. Further, the user profile 214 may include various information for the user 106, such as payment information to perform transactions for items 110 selected by the user 106 from the facility 102. The various types of data discussed herein may be stored in a data store 216 in the memory 146 of the server(s) 108, as illustrated in FIG. 2.

Further, the backend-enrollment component 208 may cause a training component 218 to train one or more trained models 220. The training component 218 may utilize training data to train the trained model(s) 220 to perform various operations for extracting and/or generating, from the image data 134, signature data 210. The trained model(s) 220 may comprise any type of model, such as machine-learning models, including but not limited to artificial neural networks, classifiers, decision trees, support vector machines, Bayesian networks, and so forth.

As a specific example, the trained model(s) 220 may include or comprise one or more convolution neural networks (CNNs), recursive neural networks, and/or any other artificial networks, that are trained to analyze image data 134 received as input, and extract, determine, identify, generate, etc., signature data 210 representing a palm of the user 106. As a specific example, the signature data 210 may comprise a 128-dimension feature vector representing the palm of the user 106. In examples where the trained model(s) 228 include one or more CNNs, various functions may be utilized to transform the image data 134 into a metric space, such as a triplet loss function. Thus, the training component 218 may train the CNNs of the trained model(s) 228 using various functions, such as a triplet loss function, to extract, identity, or otherwise determine signature data 210 from input image data 134. Once in the metric space, extracted feature data may be compared, or matched, by computing a distance between the extracted feature data and feature data stored in the enrollment database 212. For instance, when feature data is extracted from the image data 134 into signature data 210 by the trained model(s) 220, the extracted signature data 210 may then be compared to stored data in the enrollment database 218 to identify a user profile for the user 106 represented in the input image data 134. For instance, the extracted signature data 210 may comprise a vector that is compared with stored vectors in the enrollment database 212 to identify which stored vectors have the smallest "distance" between the extracted feature data. The smaller the distance, the closer the strength of correspondence between the extracted feature data and the stored feature data representing users 106 that are enrolled for use of the user-recognition system. In some examples, other calculations may be performed, such as finding a cosine of an angle between two vectors, depending on the network utilized by the trained model(s) 220. However, any type of models may be utilized for the trained model(s) 220.

For instance, in some examples, the trained models 220 may additional comprise model(s) trained to identify visually salient and discriminative feature of user palms or other portions of users. For instance, in addition to the types of models described immediately above, which the palm-identification component 148 may use to identify one or more candidate matching images, the trained models 220 may include one or more models configured to identify visually salient points in the user palms, for use by the palm-identification component 150. For example, the models 220 may be configured to identify points in a palm of a user that are visually identifiable by human users, such as a point along a crease or line, an edge point where a color differentiation exists, or the like.

These latter models, configured to identify visually salient points, may be trained in some instances using manually labeled training data that labels visually salient points in the training data. In addition, or in the alternative, these models may be trained using synthetic shapes having edges, corners, and/or the like marked as interest points. That is, the data used to train the models may comprise three-dimensional shapes having sharp contrasts at edges and corners of the shapes, which may be used to train the models to identify points of sharp contrast in user palms, such as points along lines or creases of the user palms.

The palm-identification component 148 may include various sub-components for performing various operations. For instance, the palm-identification component 148 may include a palm-feature generation component 222 to extract or otherwise generate feature data from the image data 134. The palm-feature generation component 222 may utilize the trained model(s) 228, and/or include algorithms, to perform any type of feature extraction method, or embedding, to analyze the image data 134 and extract palm-feature data, which may be stored as part of the signature data 210. For instance, the palm-feature generation component 222 may utilize state-of-the-art models, such as clustering, artificial neural networks, scale-invariant feature transform, edge detection, or any other type of extraction or embedding technology, to extract palm-feature data from the image data 134.

The palm-identification component 148 may further include a palm-feature aggregation component 224 configured to aggregate feature data for a user 106. For instance, the palm-feature aggregation component 224 may combine the palm-feature data has been extracted from a group of images depicting the user 106, such as by averaging the features in the feature data.

Once a user 106 is enrolled for use of the user-recognition system, an identity-determination component 244 may be utilized to determine and/or verify an identity of a user 106 that interacted with a user-recognition device 104. For example, the server(s) 108 may receive image data 134 from a user-recognition device 104 and the identity-determination component 244 may be configured to determine an identity of the user 106, where the enrollment database 220 indicates the identity of the user 106 by, for example, indicating the user profile 222 that is associated with that user's identity.

The identity-determination component 244 may cause a palm-feature correspondence component 226 to perform various operations for determining or identifying a user 106 whose palm is depicted in the received image data 134. For example, the palm-feature correspondence component 226 may compare the palm-feature data for the received image data 134 with palm-feature data stored in the enrollment database 212 for different user profiles 214 of users 106 enrolled in the user-recognition system in order to determine user profiles 214 for one or more users 106 whose respective palm-feature data correspond to the extracted palm-feature data. In some instances, the score calculated by the palm-feature correspondence component 226 may be compared to a threshold and, if the score is greater than the threshold, may result in identification of the user. If multiple user profiles are associated with scores that are greater than the threshold, then the user profile associated with the highest may be deemed to be associated with the image data 134 and/or further analysis may be performed to identify the appropriate user. Further, in some instances, the user-recognition system may employ set-reduction techniques to identify, based on an initial comparison, a top "N" group of user profiles 222 of users 106 whose respective palm-feature data most strongly correspond to the extracted palm-feature data. In some examples, a single user identity/profile 214 may be determined as corresponding to the input palm-feature data. However, in some examples a group of top "N" candidates may be identified by the trained model(s) 220 as corresponding with a threshold amount of strength (e.g., 50% correspondence, 75% correspondence, etc.) to the extracted palm-feature data. A second level of deeper analysis may then be performed to identify a single user from the "N" candidates.

Figure 3:
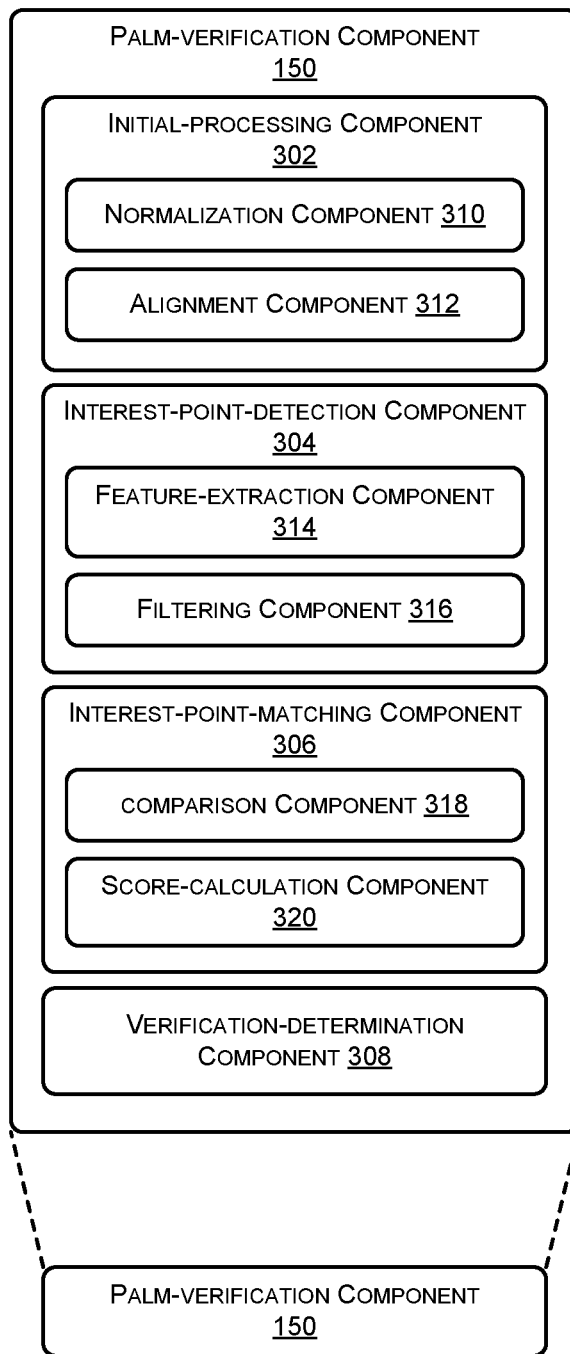
FIG. 3 illustrates example components of the palm-verification component of FIGS. 1 and 2.

For example, and as introduced above, in some instances the memory 146 may further store the palm-verification component 150. The palm-verification component 150 may function to verify whether received image data does indeed match (correspond to) the previously stored image data that the palm-identification component 148 determined as a match. In other instances, the palm-verification component 150 may determine which of the top "N" candidates most closely matches the received image data and, thus, in these instances the palm-verification component 150 may form a part of the identification process, rather than (or in addition to) the verification process. FIG. 3 describes example components of the palm-verification component 150.

At a high level, the palm-verification component 150 (or other illustrated components) may initially align and normalize received image data before comparing the received image data, or feature data generated therefrom, to other image data. For instance, the palm-verification component 150 may align the received image data to a predefined alignment such that the received image data will be compared to stored image data in an aligned manner. Further, the palm-verification component 150 may normalize the image data by, for instance, identifying a darkest pixel value and setting its value as zero (0), identifying a lightest pixel value and settings its value as two-hundred-fifty-five (255), and interpolating pixel values of the image data therebetween. After processing the received image data 134 in this and/or other manners, the palm-verification component 150 may store generated processed image data 234.

In addition, the palm-verification component 150 may then compare signature data of this now processed image data 234 to signature data of the image data determined to match the received image data (or to the top "N" candidates, in some instances). The matching portions of the image data may be stored as matching data 236. In some instances, the palm-verification component 150 determines, for a first interest point within the processed image data, whether the coordinates of this first interest point are within a threshold spatial distance of any interest points in the candidate image data. If so, the palm-verification component 150 may identify which interest point in the candidate image data is associated with coordinates that are closest to the coordinates of the first interest point (if there are multiple interest points in the candidate image data that are within the threshold spatial distance) and may determine the similarity of these two points. For instance, the palm-verification component 150 may calculate a Euclidian distance between the feature vector associated with the first interest point and the feature vector associated with the interest point in the candidate image data. This Euclidian distance may be stored as the matching data 236 and/or as score data 240 indicating a level of similarity between these two points. The palm-verification component 150 may continue to determine, for each interest point within the processed image data 234, whether the coordinates of this respective point are within a threshold spatial distance of one or more interest points in the candidate image data and, if so, may determine a Euclidian distance between the feature vector of this interest point and the closest interest point in the candidate image data. Again, this distance may be stored as matching data 236 and/or score data 240 representing how similar these points are two one another.

As illustrated, the data store 212 may further store identification data 238 and other data 242. The identification data 238 may represent data indicating which candidate image data, and/or corresponding user account, has been determined to correspond to received image data. For instance, the palm-identification component 148 and/or the palm-verification component 150 may store an indication of the image data that matches received image data and/or an indication of which user account received image data corresponds to and/or is to be associated with. In some instances, the palm-verification component 150 determines score data 240 representing a similarity between received image data (e.g., processed image data 234) and candidate image data based on the one or more Euclidian distances between interest points of these image data. For instance, the similarity score between received image data and the candidate image data may comprise a logarithm of a sum of each determined Euclidian distance. Thus, the score data for this particular match may increase with each respective matching interest point. This score data 240 may be compared to a threshold and, if the score is greater than the threshold (or otherwise satisfies one or more criteria), the image data may be determined and/or verified to match the candidate image data and, thus, the palm-verification component 150 or another component may store an indication of this match as the identification data 238.

Further, the memory 146 may store an enrollment-update component 228 configured to update the palm-feature data and/or other signature data 210 stored in association with user profiles to allow for removal of stale feature data and use of more recent feature data. As introduced above, as a user provides image data of the user's palm over time, the enrollment-update component 228 may use feature data from this new image data to generate and store additional feature data associated with the user. Further, the enrollment-update component 228 may remove or lessen a weight associated with older feature data.

In addition, the memory 146 may store an audit component 232 configured to perform one or more auditing processes in response to occurrence of one or more predefined events. For example, the audit component 232 may perform a nightly auditing processes comprising rich comparison of palm-feature data associated with respective user profiles to one another to identify any errors previously made by the system. After identifying an error, the system may correct the error and may also this information to further train the trained model(s) 220 utilizing techniques similar to those performed by the backend-enrollment component 214.

Additionally, the memory 146 may store a quality-check component 230 which determines an overall metric of the quality of the extracted palm-feature data. For instance, the quality-check component 230 may determine that additional image data 134 needs to be obtained for a user 106 for various reasons, such as a bandage or glove covering the palm of the user 106, or the like. In some examples, the quality-check component 230 may utilize a trained model(s) 220 to determine whether a feature vector is of sufficient quality and, if not, may cause the user-recognition device to request additional image data 134.

FIG. 3 illustrates example components of the palm-verification component 150 of FIGS. 1 and 2. As illustrated, the palm-verification component 150 may include an initial-processing component 302, an interest-point-detection component 304, an interest-point-matching component 306, and a verification-determination component 308. The initial-processing component 302 may include a normalization component 310 that may be configured to normalize pixel values of received image data. For instance, and as noted above, the normalization component 310 may be configured to normalize each pixel value between zero (0) and two-hundred-fifty-five (255) based on a darkest pixel being normalized to zero and a lightest pixel being normalized to two-hundred-fifty-five. The initial-processing component 310 may further include an alignment component 312, which may be configured to change an orientation of the received image data so as to align with a predefined alignment. Further, the portion of the image data corresponding to the palm may be extracted from the image data during this alignment and normalization process. It is to be appreciated, meanwhile, that the current image data may have previously been aligned and/or normalized as part of the recognition process and prior to the verification process.

The interest-point-detection component 304 may include a feature-extraction component 314 and a filtering component 316. The feature-extraction component 314 may input the now processed image data 234 into one or more of the trained models 220. As described above, the trained model may be configured to identify visually salient and discriminative interest points in the processed image data 234. The trained model of the feature-extraction component 314 may output the signature data, which may comprise respective coordinates of each interest point, a feature vector representing pixel value(s) at and/or around the respective interest point, and a confidence level associated with each respective interest point. In some instances, each interest point (or region of interest) is indicated by coordinates determined by a particular pixel, while the feature vector represents pixel values of this central pixel and one or more neighboring pixels. Thus, each feature vector may represent pixel value(s) of a single pixel, a group of nine pixels (3×3), a group of forty-nine pixels (7×7), and so forth. The filtering component 316, meanwhile, may be configured to remove, from the list of interest points in the output signature data, those interest points that are associated with respective confidence levels that are less than a predefined threshold confidence value. In some instances, those interest points with confidence values less than the threshold may not be removed from the signature data, but might instead not be used for comparing to interest point(s) in candidate image data.

The interest-point matching component 306, meanwhile, includes a comparison component 318 and a score-calculation component 320. The comparison component 318 may be configured to compare one or more interest points of processed image data to respective interest points of candidate image data. For instance, the comparison component 318 may determine, for a first interest point in the processed image data 234, whether one or more interest points exist in signature data of the candidate image data that is within a spatial-distance threshold of the first interest point. If so, the comparison component 318 may determine a similarity between the first interest point and the closet interest point in the candidate image data (e.g., the interest point having coordinates that are closest to coordinates of the first interest point). For instance, the comparison component 318 may determine a feature-vector distance (e.g., a Euclidian distance) between the feature vector of the first interest point of the feature vector of the interest point in the candidate image data. Score data indicating this distance may then be scored, which may be used for by the score-calculation component 320 for calculating an overall similarity between the image data and the candidate image data. As described above the score-calculation component 320 may generate score data indicating a similarity between the image data and the candidate image data as, for instance, a logarithm of a sum of inverse feature-vector distances of the matching interest points. Of course, while example techniques are described for determining how closely interest points match, and for calculating a score indicating whether image data match one another, other comparison and calculation techniques may be used. For example, in some instances the spatial-distance and feature-vector-distance may be used simultaneously when comparing interest points.

The verification-determination component 308, meanwhile, may determine whether processed image data corresponds to candidate image data by comparing the determined score to a threshold. If the score is greater than the threshold, then verification-determination component 308 may determine that the image data match one another. In instances where the palm-verification component 150 compares received and processed image data 234 to multiple candidate image data, the verification-determination component 308 may select the candidate image data having a highest score (that is greater than a threshold in some instances) as the matching image data.

Figure 4A:
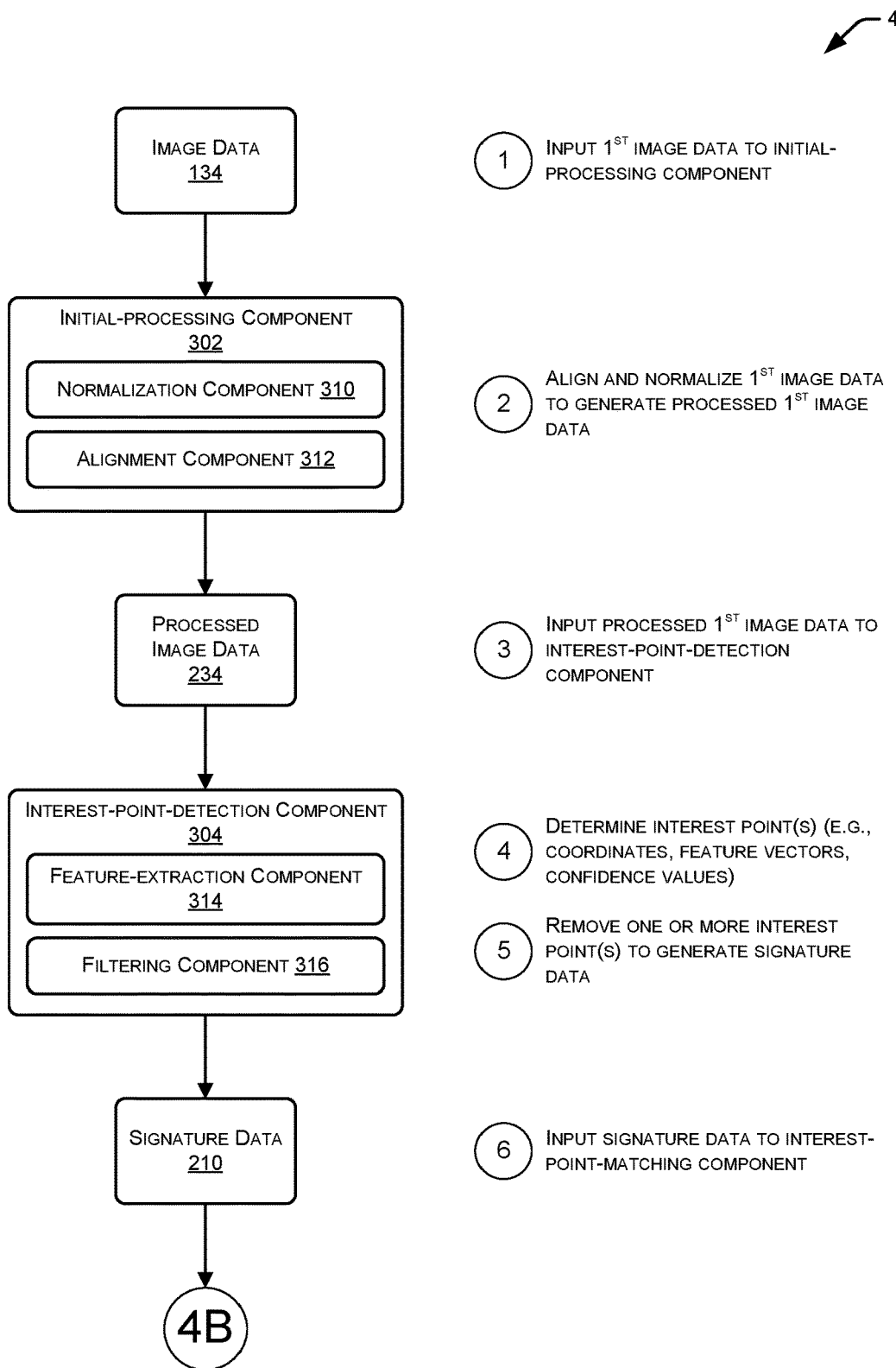
FIGS. 4A-B collectively illustrate a sequence of operations for verifying that first image data of a portion (e.g., a palm) of a user corresponds to second image data.
Figure 4B:
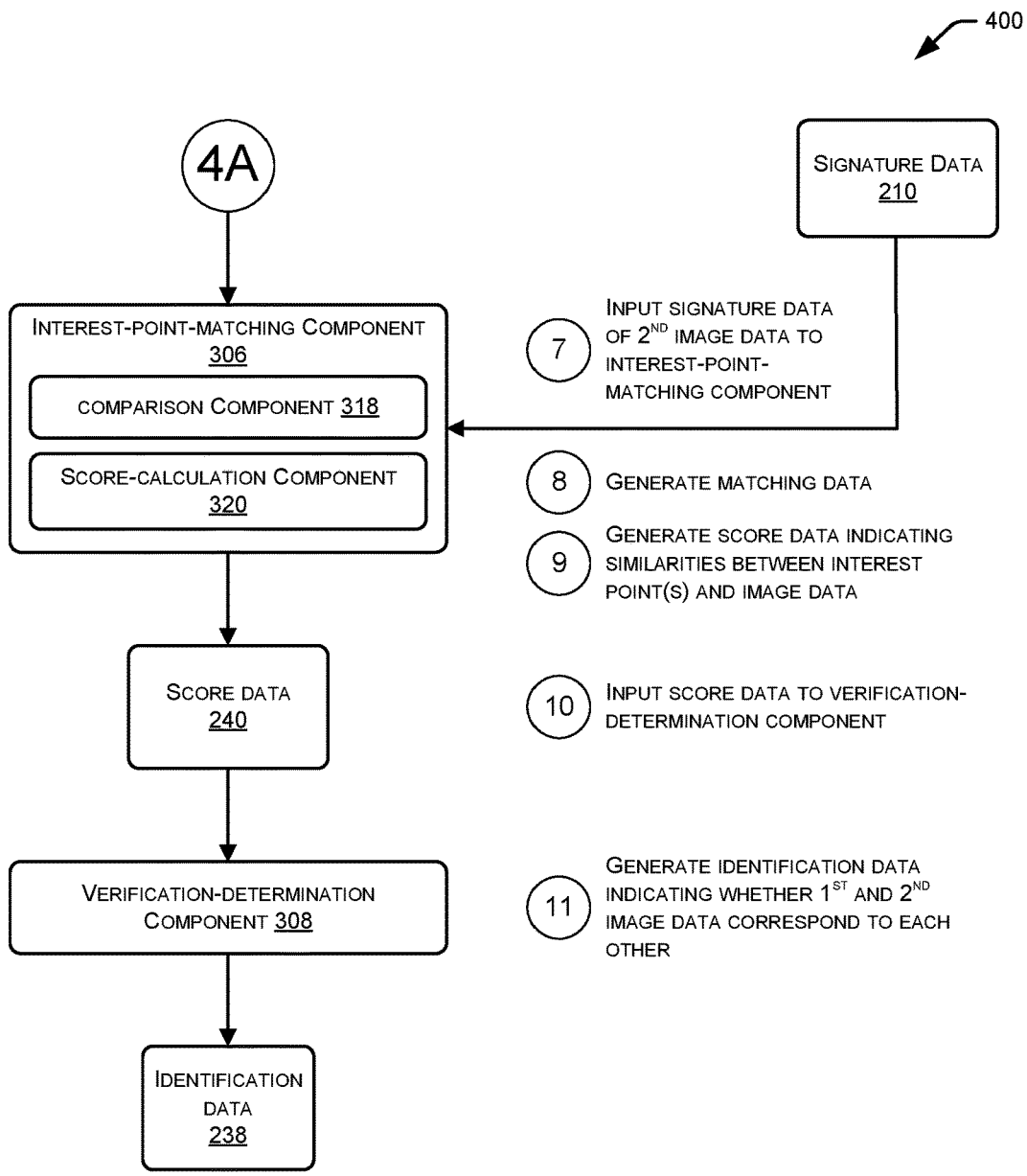

FIGS. 4A-B collectively illustrate a sequence of operations 400 for verifying that first image data of a portion (e.g., a palm) of a user corresponds to second image data. At "1", image data 134, such as image data of a palm of a user, is received and input to the initial-processing component 302. At "2", the initial-processing component 302 normalizes and aligns the image data 134 to generate processed image data 234. In some instances, the initial-processing component 302 also extracts a portion of the image data 134 corresponding to a palm of the user when generating the processed image data 234.

At "3", the processed image data 234 is input to the interest-point-detection component 304. At "4", the interest-point detection component 304 determines one or more interest points in the processed image data 234 by, for instance, inputting the processed image data 234, or feature data generated therefrom, into one or more trained models. In some instances, the trained model(s) is configured to identify, from each region of multiple regions in the processed image data 234, an interest point that is the most visually salient and/or discriminative. Thus, the trained model(s) may output the list of interest points as a list of respective coordinates, feature-vector data, and confidence levels. At "5", the filtering component 316 may remove one or more interest points that are associated with respective confidence levels that are less than a threshold. The remaining the interest points may be stored as the signature data, in some instances. At "6", the generated signature data is input to the interest-point-matching component 306.

FIG. 4B continues the illustration of the sequence of operations and includes, at "7", inputting the signature data of second image data into the interest-point-matching component 306. For instance, signature data associated with the candidate image data (e.g., as determined by the palm-identification component 148) may be input to the component 306 for attempting to match interest points of the first image data with interest points of the second image data.

At "8", the interest-point-matching component 306 generates matching data by identifying interest points in the first image data that are within a spatial-distance threshold of coordinates of interest points in the second image data and determines a Euclidian distance between these points. For instance, the component 306 may determine that first interest point in the first image data is within a threshold distance of a second interest in the second image data and may calculate, and store, matching data indicating a feature-vector-distance between feature vectors of these points. Further, a third point in the first image data may be determined to be within a threshold distance of a fourth interest point of the second image, and a Euclidian distance between these points may be determined and stored, and so forth. At "9", the component 306 may generate score data indicating respective similarities between the interest points. For instance, a first portion of the score data 240 may comprise the Euclidian difference between the first and second interest points, the Euclidian distance between the third and fourth interest points, and so forth. Further, this first portion of the score data 240 may be used to generate additional score data 240 indicating an overall similarity between the first image data and the second image data. For instance, this score may comprise a logarithm a sum of an inverse feature-vector-distance between each set of points of the matching data. Of course, while one example manner of score data has been described, other types of score data may be calculated.

At "10", this score data is input into the verification-determination component 308. At "11", the verification-determination component 308 may determine whether the first image data matches the second image data by, for instance, comparing the score data 240 indicating the similarity between the first and second image data to a threshold. If the score data 240 is greater than the threshold, then the component 308 may determine that they match and, further, may determine that the first image data represents the same user as is represented by the second image data.

Figure 5B:
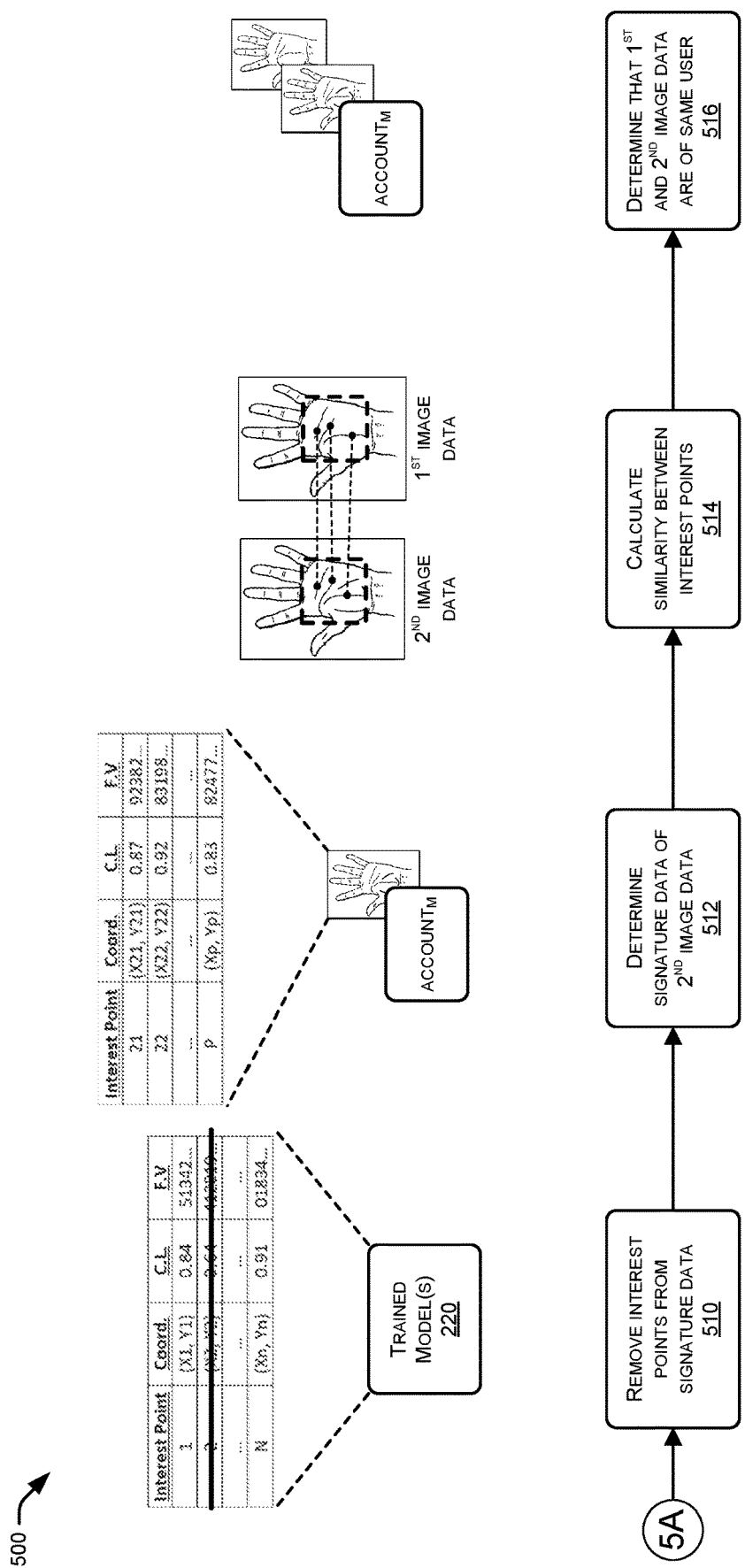

FIGS. 5A-B collectively illustrate another sequence of operations 500 for verifying that first image data of a portion (e.g., a palm) of a user corresponds to second image data. At 502, first image data of a palm of a user, such as a user entering or exiting a facility, is received. At 504, the first image data is normalized and aligned and, as illustrated, the portion of the first image data corresponding to the palm of the user may be extracted. At 506, the now-processed image data may input to a trained model. At 508, the trained model may output signature data associated with the first image data. As illustrated, the signature data may include, for each of multiple interest points, an identifier of the interest (e.g., 1, 2, . . . , N), coordinates of each respective interest point, a feature vector based on pixel value(s) of the interest point (e.g., 3×3 pixel region, 7×7 pixel region, etc.) and a confidence level of each interest point.

FIG. 5B continues the illustration of the sequence of operations 500 and includes, at 510, remove one or more interest points from the signature data based on the confidence levels. For instance, those interest point(s) having respective confidence levels that are less than a threshold may be removed from the signature data. At 512, the signature data of second image data may be determined. For instance, a candidate image data may be determined (e.g., using the palm-identification component 148) and corresponding signature data of this image data may be determined (e.g., as stored or via the trained model). At 514, a similarity between interest points in the signature data may be determined, as described above, and, at 516, in this example it may be determined that the first image data and the second image data both represent the same user.

Figure 6:
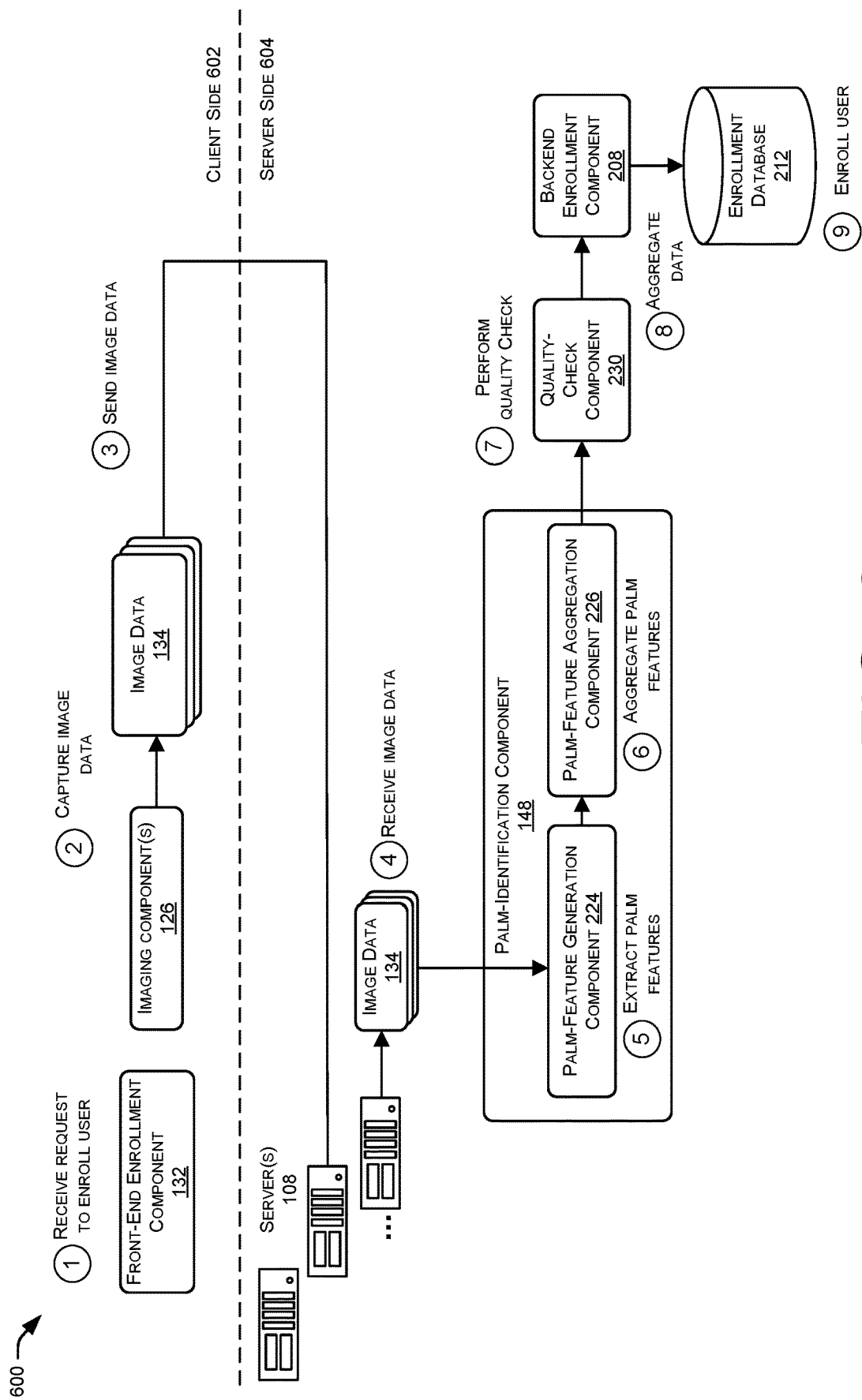
FIG. 6 illustrates an example of sequence of operations for enrolling a user with the user-recognition system of FIGS. 1-3.

FIG. 6 illustrates an example of sequence of operations for enrolling a user with the user-recognition system of FIGS. 1 and 2. This figure also illustrates an example environment including block diagram of one or more servers 108 configured to support at least a portion of the functionality of a user-recognition system, as well as an example flow of data within the system for enrolling a user 106 for use of the user-recognition system.

As illustrated, the environment 600 includes a client side 602 and a server side 604. However, this is merely illustrative, and some or all of the techniques may be performed entirely on the client side 602, or entirely on the server side 604. At "1," a front-end enrollment component 132 may receive a request to enroll a user 106 for use of the user-recognition system. For example, the request may comprise various types of input, such as a selection made via an I/O interface 128 (e.g., touch screen, mouse, keyboard, etc.) of a user interface element presented on a display for starting an enrollment process. Additionally, the front-end enrollment component 132 may detect a speech utterance from the user 106 indicating a request to enroll (e.g., "please enroll me," "I would like to check out," etc.). Another request example may include the user 106 sliding a user ID card into an I/O interface 128, such as a credit card, driver's license, etc. However, any type of input may be detected as a request by the front-end enrollment component 132.

Upon receiving the request to enroll, the front-end enrollment component 132 may activate or otherwise utilize the imaging component(s) 126 to generate image data 134 representing a palm of the user 106. At "2," the user-recognition device 104 then captures image data 134 and, at "3", sends the image data 134 to the server(s) 108. For instance, the user-recognition device 104 may encode and send the audio data 142 and image data 134 over the network(s) 138 to the server(s) 108. Further, in some instances some of the images may be removed if there are not in focus, do not have a threshold level of discriminability of the characteristics of the palm of the user, or the like. This removal may occur on the client side 402 and/or the server side 404.

At "4," the servers receive the image data and, at "5", the palm-feature generation component 222 may extract palm-feature data from the image data 134. In some examples, prior to extracting the palm-feature data, the palm-feature generation component 222 may perform various operations for processing the image data 134 prior to extracting the palm-feature data. For instance, the palm-feature generation component 222 may initially perform user detection to determine that the image data 134 represents a palm of a user 106. For instance, the palm-feature generation component 222 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting at least a portion of the user 106 and represented by the image data 134. Further, the palm-feature generation component 222 may perform hand-pose estimation in order to align the palm of the user 106 with a common coordinate system. After aligning the image of the hand into a common coordinate section, the portion of the image data corresponding to the palm may be identified and cropped. This remaining portion of the image data may thereafter be used to extract features therefrom by, for example, running a neural network on the cropped section of the image data. In some examples, hand-pose estimation may improve the extraction of features representing the palm of the user 106. Once the hand of the user 106 has been aligned, the palm-feature generation component 222 may extract features (e.g., signature data 210) from the image data 134. In some examples, the trained model(s) 228 may utilize a triples loss function which converts image data 134 into a feature embedding in a metric space (e.g., signature data 210), which may allow for comparisons with subsequent feature vectors using, for example, squared distance calculation.

At "6," the palm-feature aggregation component 224 may aggregate feature data (e.g., signature data 210) from various image data 134. For instance, the image data 134 may represent the hand of the user 106 at different angles, under different lighting conditions, or other differing characteristics. The palm-feature aggregation component 224 may aggregate the palm-feature data together, such as by averaging out feature vectors.

At "7," the quality-check component 230 may perform a quality check on the palm-feature data. For example, the quality-check component 230 may utilize a trained model(s) 228 to determine an overall metric of the quality of the extracted palm-feature data. If the overall metric is poor, or below a threshold quality level, the user-recognition system may request to acquire additional image data 134. In addition, or in the alternative, the quality-check component 230 may perform a de-duping process to ensure that the user associated with the palm-feature data hasn't already enrolled in the system. If the overall quality metric is good or acceptable, and if the de-duping process does not reveal that the user has previously enrolled in the system, the backend enrollment component 214 may aggregate the data at "8."

For example, at "8" the backend-enrollment component 214 may aggregate the palm-feature data and enroll the user at "9" in the enrollment database 220. The backend-enrollment component 214 may store associations (e.g., mappings) between the palm-feature data with a user profile 222 of the user 106 requesting to be enrolled for use of the user-recognition system.

Figure 7:
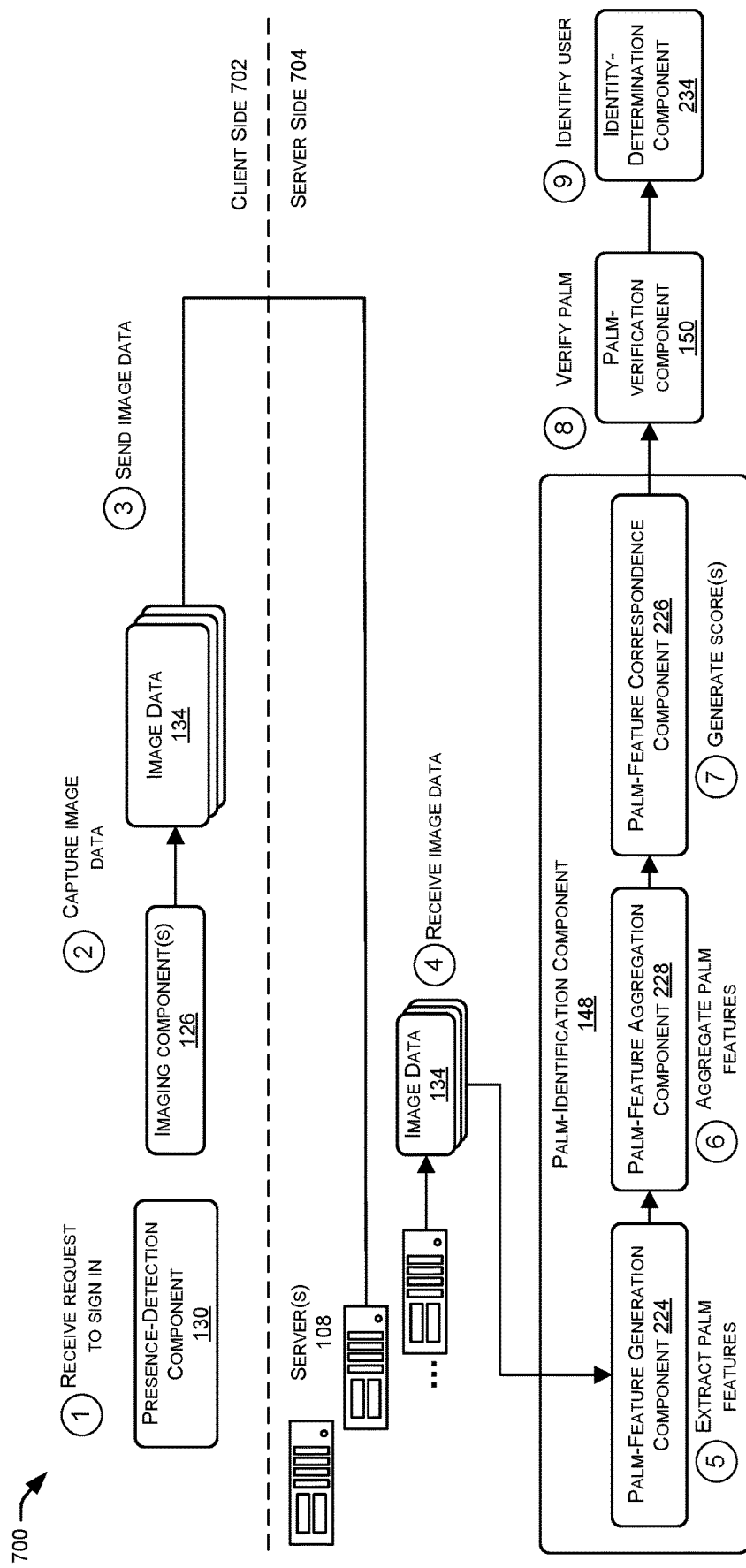
FIG. 7 illustrates an example sequence of operations for determining and verifying that first image data corresponds to second image data using components of the user-recognition system of FIGS. 1-3.

FIG. 7 illustrates an example sequence of operations for determining and verifying that first image data corresponds to second image data using components of the user-recognition system. This figure also illustrates an example environment 700 including a block diagram of one or more servers 108 configured to support at least a portion of the functionality of a user-recognition system, as well as an example flow of data within the system for identifying a user 106 of the user-recognition system and, potentially, updating the enrollment of the user. As illustrated, the environment 700 includes a client side 702 and a server side 704. However, this is merely illustrative, and some or all of the techniques may be performed entirely on the client side 702, or entirely on the server side 704.

At "1," a user requests to sign in with the user-recognition system. For example, the presence-detection component 130 may be executable by the processor(s) 120 to detect a trigger indicating presence of the user 106. The trigger detected by the presence-detection component 130 may comprise one or more types of input. For instance, the presence-detection component 130 may include logic to detect, using one or more imaging components 126, a portion of a user 106 (e.g., a hand over the imaging component(s) 126 of the user-recognition device 104). Other examples of triggers detected by the presence-detection component 130 that may indicate the presence of the user 106 may include receiving touch input (or other input, such as a mouse click) via one or more I/O interfaces 128 of the user-recognition device 104. However, any type of input may be detected as a trigger by the presence-detection component 130.

Upon identifying the request to sign in from the user, at "2" one or more imaging components 126 may generate image data 134 representing a palm of the user 106 and/or another portion of the user. At "3," the user-recognition device 104 may send the image data 134 to the server(s) 108. For instance, the user-recognition device 104 may encode and send the image data 134 over the network(s) 138 to the server(s) 108. Again, some of the image data 134 may be discarded based on the image data being out of focus, having a discriminability that is less than the threshold, and/or the like.

At "4," the servers may receive the image data 134 and, at "5", the palm-feature generation component 222 may extract palm-feature data from the image data 134. In some examples, prior to extracting the palm-feature data, the palm-feature generation component 222 may perform various operations for processing the image data 134 prior to extracting the palm-feature data. For instance, the palm-feature generation component 222 may initially perform palm detection to determine that the image data 134 represents a hand of a user 106. For instance, the palm-feature generation component 222 may utilize an Integrated Sensor Processor (ISP) that performs hardware-based user detection techniques. In some examples, various software techniques may additionally, or alternatively be performed. In either instance, a bounding box may be output around the detected hand of the user 106 for an image depicting the user 106 and represented by the image data 134. Further, the palm-feature generation component 222 may perform hand pose estimation to align the face of the user 106 with a common coordinate system. In some examples, hand pose estimation may improve the extraction of features representing the hand of the user 106. Once the hand of the user 106 has been aligned, the palm-feature generation component 222 may extract features (e.g., signature data 210) from the image data 134. In some examples, the trained model(s) 228 may utilize a triples loss function which converts the image data 134 into a feature embedding in a metric space (e.g., signature data 210), which may allow for comparisons with subsequent feature vectors using, for example, squared distance calculation.

At "6," the palm-feature aggregation component 224 may aggregate feature data (e.g., signature data 210) from various image data 134. For instance, the image data 134 may represent the hand of the user 106 at different angles, under different lighting conditions, or other differing characteristics. The palm-feature aggregation component 224 may aggregate the palm-feature data together, such as by averaging out feature vectors.

At "7," the palm-feature correspondence component 226 may generate one or more scores indicating a similarity between the aggregated features associated with the image data 134 and respective feature data stored in association with respective user profiles. In some examples, these correspondence scores may be determined, at least in part, on "distances" between the feature vector associated with the image data and respective feature vectors of the respective palm-feature data stored in association with user profiles in the enrollment database 220.

At "8", the palm-verification component 150 may perform one or more verification processes. For instance, the component 150 may receive, from the palm-identification component 148, an indication of a user profile associated with the feature vector having the closest distance to the feature vector associated with the image data 134. The palm-verification process 150 may then perform the sequence of operations 400 and/or 500 to compare the received image data with the image data associated with the identified user profile to verify that these image data do in fact correspond to a common user. At "9," the identity-determination component 244 may then store an indication that the received image data is associated with the identified user profile.

Figure 8A:
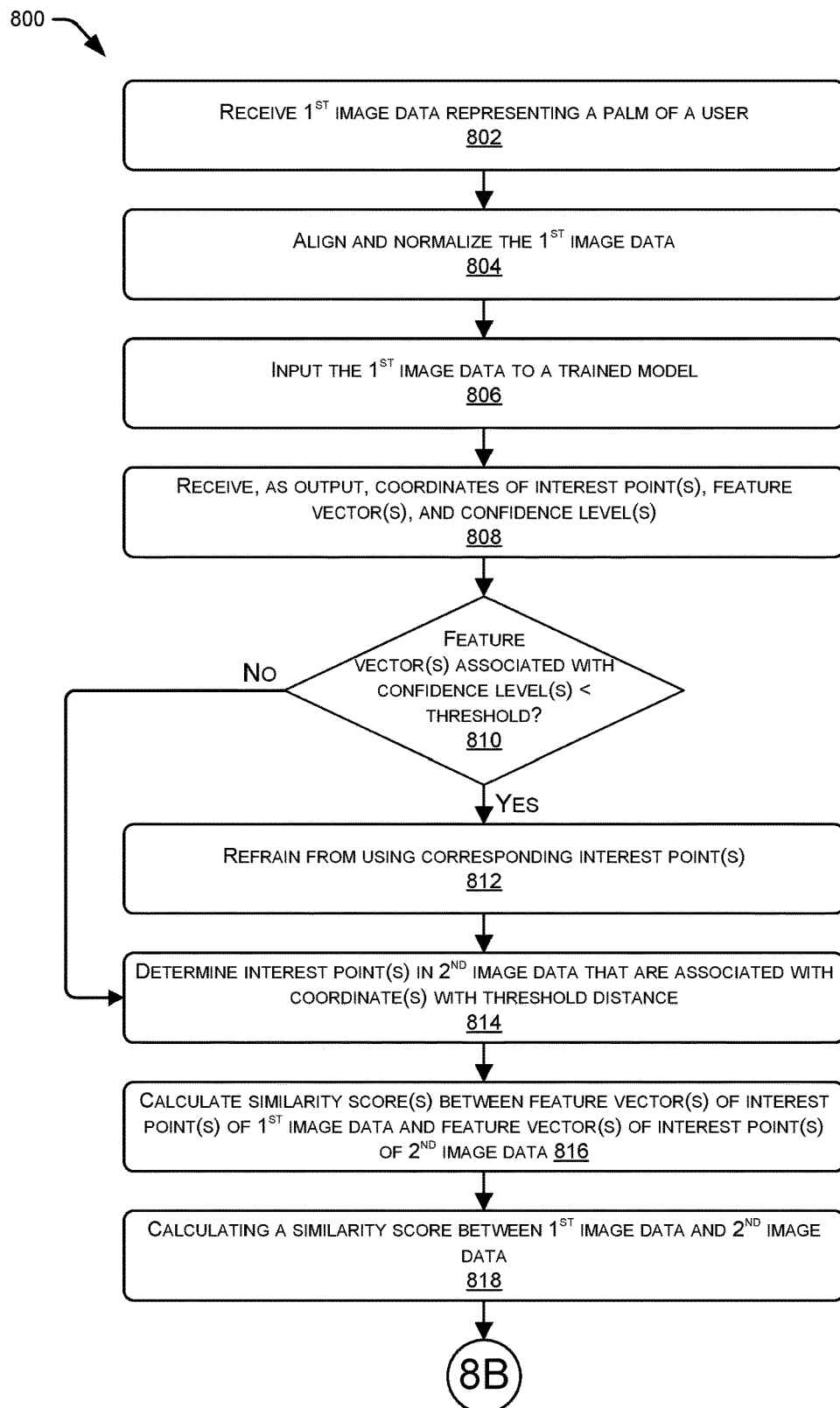
FIGS. 8A-B collectively a flow diagram of an example process that palm-verification component of the user-recognition system may implement.
Figure 8B:
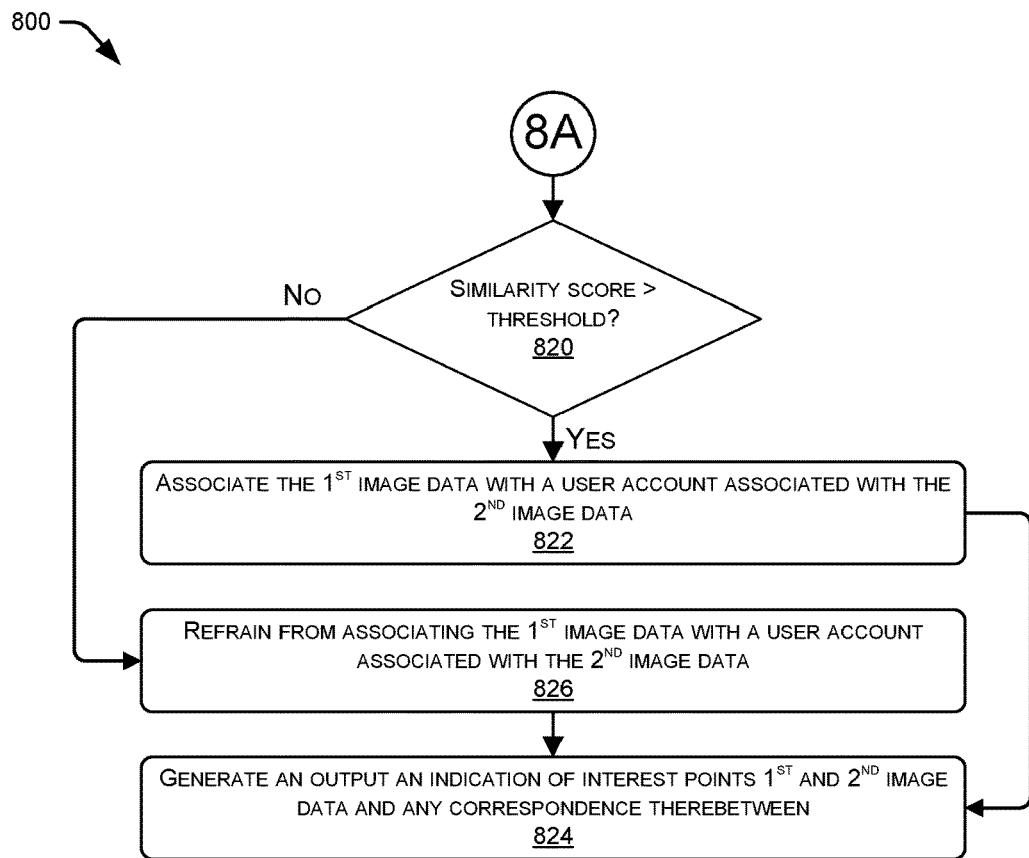

FIGS. 8A-B collectively a flow diagram of an example process 800 that palm-verification component of the user-recognition system may implement. The process 800, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by the servers 108, the user-recognition device 104, and/or a combination thereof.

An operation 802 represents receiving first image data representing a palm of a user. As described above, one or more servers 108 may receive this first image data from a user-recognition device 104.

An operation 804 represents aligning and normalizing the first image data, while an operation 806 represents inputting the first image data (as aligned and normalized) into a trained model. In some instances, the trained model may be configured to identify one or more visually salient portions of users palms, such that human users may be able to visually analyze and identify these portions.

An operation 808 represents receiving, as output of the trained model, first coordinates associated with a first interest point in the first image data, a first feature vector representing one or more pixel values associated with the first coordinates, and a first confidence level associated with the first feature vector. In some instances, the first interest point corresponds to a visually salient point of a palm represented in the first image data. Further, in some instances, the trained model may output multiple interest points, each associated with this data.

An operation 810 represents determining whether one or more feature vectors are associated with respective confidence levels that are less than a confidence level threshold. If so, then an operation 812 represents refraining from using the corresponding interest point(s) when calculating subsequent similarity score(s). If not, or after the operation 812, an operation 814 represents determining interest point(s) in second image data that are associated with respective coordinates that are within a threshold distance of interest point(s) in the first image data.

An operation 816 represents calculating similarity score(s) between feature vector(s) of interest point(s) of the first image data and feature vector(s) of interest point(s) of the second image data. This operation may comprise, for instance, calculating a respective Euclidian distance between an interest point in the first image data and an interest point in the second image data. An operation 818 represents calculating a similarity score between the first image data and the second image data based on the similarity score(s) between the interest points. This operation may comprise, for instance, calculating the similarity score between the first image data and the second image data as a logarithm of a sum of an inverse of each feature-vector-distance.

FIG. 8B concludes the illustration of the process 800 and includes, at an operation 820, determining whether the similarity score indicating the similarity between the first image data and the second image data is greater than a threshold score. If so, then an operation 822 represents associating the first image data with a user account to which the second image data is associated. An operation 824 represents outputting an indication of interest points in the first image data, interest points in the second image data, and any correspondences therebetween. For instance, this operation may comprise outputting a graphical user interface displaying the first image data and the second image data, and points in the first image data that have been determined to match to points in the second image data. For instance, this operation may comprise outputting an interface showing data similar to that shown above the operation 514 in FIG. 5B. If, however, the similarity is not greater than the threshold, then an operation 826 represents refraining from associating the first image data with the user account and thereafter outputting the indication of the operation 824. It is to be appreciated that a human user may use the data output at the operation 824 for making a visual, manual confirmation regarding the determination made by the system regarding whether or not the first image data and the second image data represent the same user palm.

Figure 9A:
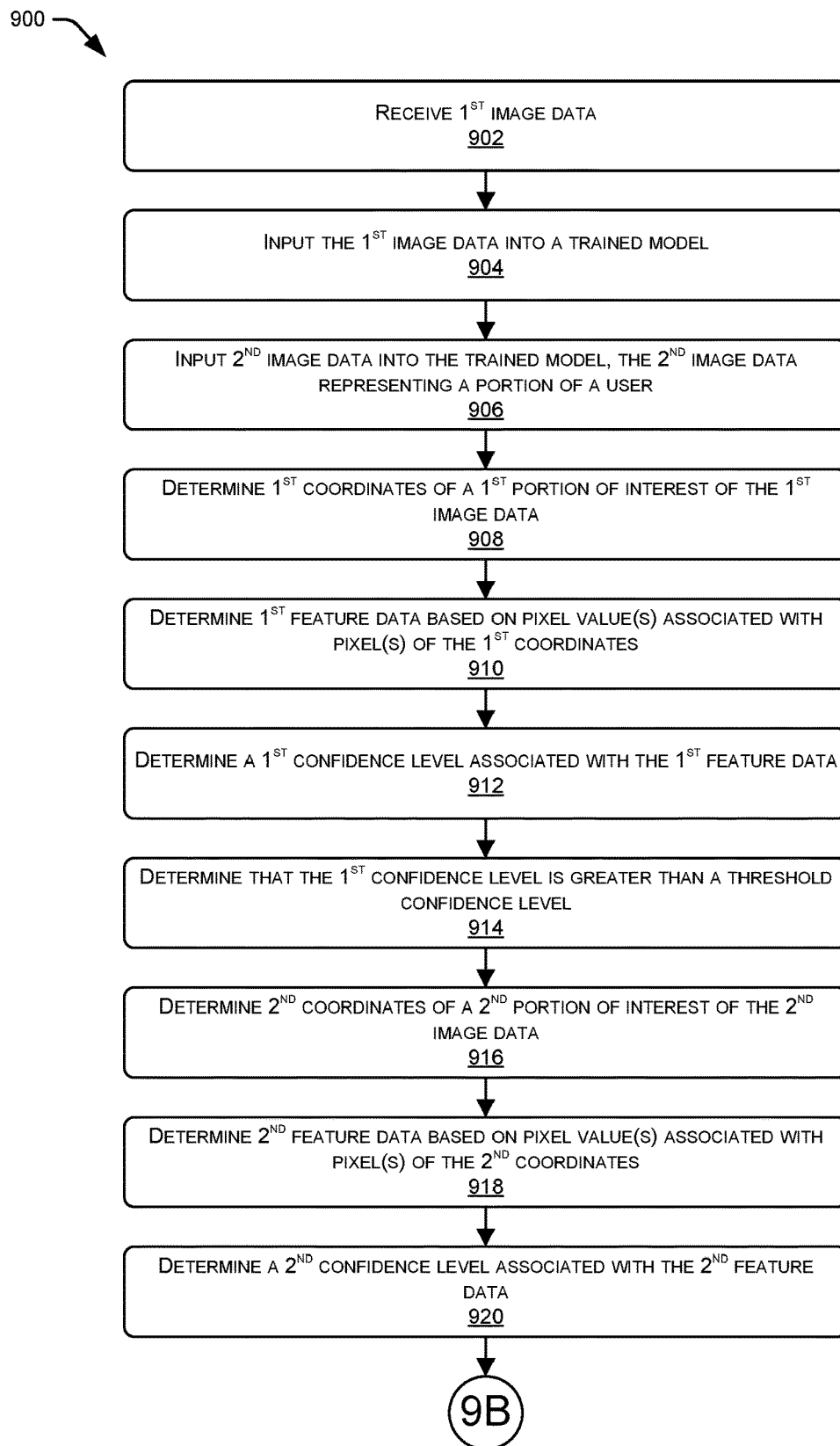
FIGS. 9A-B collectively a flow diagram of another example process that palm-verification component of the user-recognition system may implement.
Figure 9B:
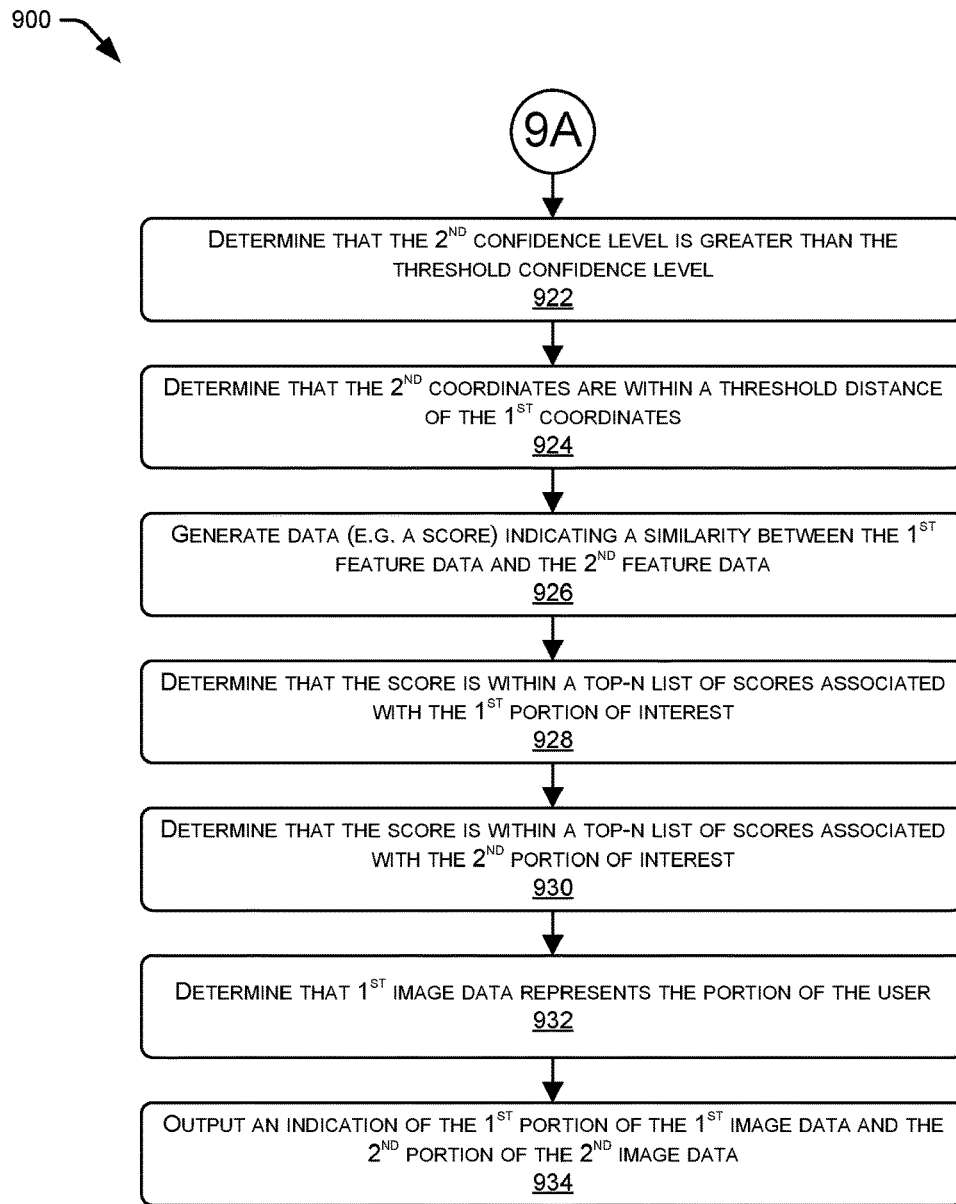

FIGS. 9A-B collectively a flow diagram of another example process 900 that palm-verification component of the user-recognition system may implement.

An operation 902 represents receiving first image data, while an operation 904 represents inputting the first image data into a trained model. An operation 906 represents inputting second image data into the trained model, where the second image data represents a portion of a user, such as a palm of the user.

An operation 908 represents determining first coordinates associated with a first portion of interest of the first image data, such as first coordinates associated with a first group of pixels (e.g., 3×3, 7×7, 9×9, etc.). An operation 910 represents determining first feature data based at least in part on one or more pixel values associated with the first coordinates. For instance, in the example of a 7×7 pixel region, the first feature data may be generated representing the pixel values of this group of forty-nine pixels.

An operation 912 represents determining a first confidence level associated with the first feature data, while an operation 914 represents determining that the first confidence level is greater than a threshold value. An operation 916 represents determining second coordinates associated with a second portion of interest of second image data, the second image data representing a portion of a user, while an operation 918 represents determining second feature data based at least in part on one or more pixel values associated with the second coordinates. An operation 920 represents determining a second confidence level associated with the second feature data.

FIG. 9B continues the illustration of the process 900 and includes, at an operation 922, determining that the second confidence value is greater than the threshold value. An operation 924 represents determining that the second coordinates are within a threshold spatial distance of the first coordinates and, thus, an operation 926 represents generating data (e.g., a score) indicating a similarity between the first feature vector and the second feature vector. An operation 928 represents determining that this score is within a top-N list of scores associated with the first portion of interest, while an operation 930 represents determining that this score is within a top-N list of scores associated with the second portion of interest. That is, the operations 928 and 930 represent determining that the match between the first interest and the second interest point was a relatively high match from the perspective of the first interest point, and that the match between the first interest and the second interest point was a relatively high match from the perspective of the second interest point.

An operation 932 represents determining that the first image data represents the portion of the user. That is, this operation represents determining that the first image data represents the same user palm or other portion as is represented by the second image data. Thus, an operation 934 represents outputting an indication of the first portion of the first image data and the second portion of the second image data, as well an indication of the correspondence therebetween. For instance, this operation may comprise outputting a graphical user interface indicating that the first image data, the second image data, one or more interest points that have been determined to match between the first and second image data. Thus, a human user can visually confirm whether the first and second image data both represent the same palm or other portion of the user.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. Method comprising:
receiving first image data representing a palm of a user;
inputting at least a portion of the first image data to a trained model configured to identify one or more visually salient portions of user palms;
receiving, as output of the trained model, first coordinates associated with a first interest point in the first image data and a first feature vector representing one or more pixel values associated with the first coordinates, wherein the first interest point corresponds to a visually salient point of a palm represented in the first image data;
determining that second coordinates associated with a second interest point in second image data is within a threshold distance of the first coordinates, wherein the second interest point corresponds to visually salient point of a palm represented in the second image data and wherein the second image data is associated with a user account;
calculating a first similarity score between the first feature vector and a second feature vector representing one or more pixel values associated with the second coordinates;
calculating, using the first similarity score, a second similarity score between the first image data and the second image data;
associating the first image data with the user account based at least in part on the second similarity score; and
outputting data indicating the first interest point at the first coordinates of the first image data and the second interest point at the second coordinates of the second image data.

2. The method as recited in claim 1, wherein the receiving, as output of the trained model, further comprises:
  receiving a first confidence value associated with the first feature vector; and
  receiving third coordinates associated with a third interest point in the first image data, a third feature vector representing one or more pixel values associated with the third coordinates, and a second confidence value associated with the third feature vector;
and the method further comprising:
  determining that the first confidence value is greater than a threshold confidence value;
  determining that the third confidence value is less than the threshold confidence value; and
  refraining from calculating a similarity score using the third feature vector based at least in part on the determining that the third confidence value is less than the threshold confidence value.

3. The method as recited in claim 1, further comprising:
receiving, prior to the inputting, third image data representing the palm of the user; and
generating the first image data by aligning the third image data according to a predefined alignment and normalizing pixel values of the third image data.

4. The method as recited in claim 1, further comprising:
determining that third coordinates associated with a third interest point in the second image data is within the threshold distance of the first coordinates;
calculating a third similarity score between the first feature vector and a third feature vector representing one or more pixel values associated with the third coordinates; and
determining that the first similarity score is greater than the third similarity score;
and wherein the calculating the second similarity score using the first similarity score comprises calculating the second similarity score using the first similarity score based at least in part on the determining that the first similarity score is greater than the third similarity score.

5. A system comprising:
one or more processors; and
one or more computer-readable media storing computer-executable instructions that, when executed, cause the one or more processors to perform acts comprising:
  receiving first image data;
  inputting the first image data into a trained model to determine first coordinates associated with a first portion of interest of the first image data, the trained model configured to identify one or more visually salient portions of user palms;
  determining first feature data based at least in part on one or more pixel values associated with the first coordinates;
  inputting second image data into the trained model to determine second coordinates associated with a second portion of interest of second image data, the second image data representing a palm of a user;
  determining second feature data based at least in part on one or more pixel values associated with the second coordinates;
  generating first data indicating a similarity between the first feature data and the second feature data;
  determining third coordinates associated with a third portion of interest of the first image data;
  determining third feature data based at least in part on one or more pixel values associated with the third coordinates;
  determining fourth coordinates associated with a fourth portion of interest of the second image data;
  determining fourth feature data based at least in part on one or more pixel values associated with the fourth coordinates; and
  generating second data indicating a similarity between the third feature data and the fourth feature data
  determining, using the first data and the second data, that the first image data represents the palm of the user.

6. The system as recited in claim 5, wherein the one or more computer-readable media further store computer-executable instructions that, when executed, cause the one or more processors to perform acts comprising outputting third data indicating the first portion of interest at the first coordinates of the first image data and the second portion of interest at the second coordinates of the second image data.

7. The system as recited in claim 5, wherein the one or more computer-readable media further store computer-executable instructions that, when executed, cause the one or more processors to perform an act comprising:
  determining that the second coordinates are within a threshold distance of the first coordinates;
  and wherein the generating the first data comprises generating the first data indicating the similarity between the first feature data and the second feature data based at least in part on the determining that the second coordinates are within the threshold distance of the first coordinates.

8. The system as recited in claim 5, wherein the one or more computer-readable media further store computer-executable instructions that, when executed, cause the one or more processors to perform an act comprising:
  determining fifth coordinates associated with a fifth portion of interest of the second image data;
  determining fifth feature data associated based least in part on one or more pixel values associated with the fifth coordinates;
  generating third data indicating a similarity between the first feature data and the third feature data; and
  determining, based at least in part on the first data and the third data, that the similarity between the first feature data and the second feature data is greater than the similarity between the first feature data and the fifth feature data;
  and wherein the determining that the first image data represents the palm of the user comprises determining, using the first data, that the first image data represents the palm of the user based at least in part on the determining that the similarity between the first feature data and the second feature data is greater than the similarity between the first feature data and the fifth feature data.

9. The system as recited in claim 8, wherein the one or more computer-readable media further store computer-executable instructions that, when executed, cause the one or more processors to perform an act comprising:
  determining sixth coordinates associated with a sixth portion of interest of the first image data;
  determining sixth feature data associated based least in part on one or more pixel values associated with the sixth coordinates;
  generating fourth data indicating a similarity between the second feature data and the sixth feature data; and determining, based at least in part on the first data and the fourth data, that the similarity between the first feature data and the second feature data is greater than the similarity between the second feature data and the sixth feature data;

and wherein the determining that the first image data represents the palm of the user comprises determining, using the first data, that the first image data represents the palm of the user based at least in part on the determining that the similarity between the first feature data and the second feature data is greater than the similarity between the second feature data and the sixth feature data.

10. The system as recited in claim 5, wherein the one or more computer-readable media further store computer-executable instructions that, when executed, cause the one or more processors to perform an act comprising:
determining a first confidence value associated with the first feature data;
determining that the first confidence value is greater than a threshold value;
determining a second confidence value associated with the third feature data;
determining that the second confidence value is less than the threshold value; and
determining to refrain from generating third data indicating a similarity between the third feature data and feature data associated with the second image data based at least in part on determining that the second confidence value is less than the threshold value.

11. The system as recited in claim 5, wherein:
the first portion of interest comprises a first pixel of the first image data and at one or more pixels adjacent to the first pixel; and
the second portion of interest comprises a second pixel of the second image data and at one or more pixels adjacent to the second pixel.

12. A method comprising:
receiving first image data;
inputting the first image data into a trained model to determine first coordinates associated with a first portion of interest of the first image data, the trained model configured to identify one or more visually salient portions of user palms;
determining first feature data based at least in part on one or more pixel values associated with the first coordinates;
inputting second image data into the trained model to determine second coordinates associated with a second portion of interest of second image data, the second image data representing a palm of a user;
determining second feature data based at least in part on one or more pixel values associated with the second coordinates;
generating first data indicating a similarity between the first feature data and the second feature data;
determining third coordinates associated with a third portion of interest of the first image data;
determining third feature data based at least in part on one or more pixel values associated with the third coordinates;
determining fourth coordinates associated with a fourth portion of interest of the second image data;
determining fourth feature data based at least in part on one or more pixel values associated with the fourth coordinates; and generating second data indicating a similarity between the third feature data and the fourth feature data;
determining, using the first data and the second data, that the first image data represents the palm of the user.

13. The method as recited in claim 12, further comprising and outputting third data indicating the first portion of interest at the first coordinates of the first image data and the second portion of interest at the second coordinates of the second image data.

14. The method as recited in claim 12, further comprising:
determining that the second coordinates are within a threshold distance of the first coordinates;
and wherein the generating the first data comprises generating the first data indicating the similarity between the first feature data and the second feature data based at least in part on the determining that the second coordinates are within the threshold distance of the first coordinates.

15. The method as recited in claim 12, further comprising:
determining fifth coordinates associated with a fifth portion of interest of the second image data;
determining fifth feature data associated based least in part on one or more pixel values associated with the fifth coordinates;
generating third data indicating a similarity between the first feature data and the fifth feature data; and
determining, based at least in part on the first data and the third data, that the similarity between the first feature data and the second feature data is greater than the similarity between the first feature data and the fifth feature data;
and wherein the determining that the first image data represents the palm of the user comprises determining, using the first data, that the first image data represents the palm of the user based at least in part on the determining that the similarity between the first feature data and the second feature data is greater than the similarity between the first feature data and the fifth feature data.

16. The method as recited in claim 15, further comprising:
determining sixth coordinates associated with a sixth portion of interest of the first image data;
determining sixth feature data associated based least in part on one or more pixel values associated with the sixth coordinates;
generating fourth data indicating a similarity between the second feature data and the sixth feature data; and
determining, based at least in part on the first data and the fourth data, that the similarity between the first feature data and the second feature data is greater than the similarity between the second feature data and the sixth feature data;
and wherein the determining that the first image data represents the palm of the user comprises determining, using the first data, that the first image data represents the palm of the user based at least in part on the determining that the similarity between the first feature data and the second feature data is greater than the similarity between the second feature data and the sixth feature data.

17. The method as recited in claim 12, further comprising:
determining a first confidence value associated with the first feature data;
determining that the first confidence value is greater than a threshold value;
determining a second confidence value associated with the third feature data;

determining that the second confidence value is less than the threshold value; and determining to refrain from generating third data indicating a similarity between the third feature data and feature data associated with the second image data based at least in part on determining that the second confidence value is less than the threshold value.

18. The method as recited in claim 12, wherein:

the first portion of interest comprises a first pixel of the first image data and at one or more pixels adjacent to the first pixel; and the second portion of interest comprises a second pixel of the second image data and at one or more pixels adjacent to the second pixel.

\* \* \* \* \*

UNITED STATES PATENT AND TRADEMARK OFFICE
CERTIFICATE OF CORRECTION

PATENT NO. : 11,663,805 B1
APPLICATION NO. : 17/209845
DATED : May 30, 2023
INVENTOR(S) : Zheng Tang et al.

It is certified that error appears in the above-identified patent and that said Letters Patent is hereby corrected as shown below:

In the Claims

Column 30, Line 36, Claim 1 change "Method" to -- A method --.

Signed and Sealed this
Fourth Day of July, 2023

Katherine Kelly Vidal
*Director of the United States Patent and Trademark Office*